(12) United States Patent
Kato

(10) Patent No.: US 11,022,560 B2
(45) Date of Patent: Jun. 1, 2021

(54) IMAGE INSPECTION DEVICE

(71) Applicant: OMRON Corporation, Kyoto (JP)

(72) Inventor: Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/219,968

(22) Filed: Dec. 14, 2018

(65) Prior Publication Data

US 2019/0277771 A1    Sep. 12, 2019

(30) Foreign Application Priority Data

Mar. 8, 2018    (JP) .............................. JP2018-041889

(51) Int. Cl.
*G01N 21/88*    (2006.01)
*H04N 5/225*    (2006.01)
(Continued)

(52) U.S. Cl.
CPC ......... *G01N 21/8806* (2013.01); *G03B 15/03* (2013.01); *G03B 21/00* (2013.01); *G03B 37/04* (2013.01); *H04N 5/2254* (2013.01); *H04N 5/2256* (2013.01); *H04N 5/2354* (2013.01); *H04N 5/23216* (2013.01);
(Continued)

(58) Field of Classification Search
CPC ........... G01N 21/8806; G01N 21/8816; G01N 2021/8812; G01N 2021/8835; H04N 7/18; H04N 5/2354; H04N 5/247; H04N 5/23216; H04N 5/2256; H04N 5/2254;
(Continued)

(56) References Cited

U.S. PATENT DOCUMENTS 5,060,065 A    10/1991 Wasserman
5,461,417 A    10/1995 White et al.
(Continued)

FOREIGN PATENT DOCUMENTS

EP    1930719    6/2008
JP    H09307697    11/1997
(Continued)

OTHER PUBLICATIONS

"Search Report of Europe Counterpart Application", dated Jul. 3, 2019, p. 1-p. 7.
(Continued)

*Primary Examiner* — Abdelaaziz Tissire
(74) *Attorney, Agent, or Firm* — JCIPRNET

(57) ABSTRACT

An image inspection device which can image an object with a plurality of cameras in a state in which the object is optimally illuminated and which can also be downsized is provided. The image inspection device includes a plurality of imaging parts that image the object, an illumination part that is disposed between the object and the plurality of imaging parts and radiates light toward the object and has a light-transmissive property, and a control part that controls the plurality of imaging parts and the illumination part. The illumination part includes a plurality of illumination elements which are arranged in a matrix and are allowed to be turned on independently. The control part controls the plurality of illumination elements to cause the illumination part to illuminate a region of the object corresponding to a field of view of the plurality of imaging parts.

19 Claims, 32 Drawing Sheets

(51) Int. Cl.
    *H04N 5/247*       (2006.01)
    *H04N 5/232*       (2006.01)
    *G03B 15/03*       (2021.01)
    *H04N 5/235*       (2006.01)
    *G03B 37/04*       (2021.01)
    *G03B 21/00*       (2006.01)
    *H04N 7/18*         (2006.01)

(52) U.S. Cl.
    CPC ............... *H04N 5/247* (2013.01); *H04N 7/18* (2013.01); *G01N 2021/8812* (2013.01); *G01N 2021/8835* (2013.01); *G03B 2215/0567* (2013.01); *G03B 2215/0592* (2013.01); *H04N 7/181* (2013.01)

(58) Field of Classification Search
    CPC ........ H04N 7/181; G03B 21/00; G03B 37/04; G03B 15/03; G03B 2215/0567; G03B 2215/0592
    See application file for complete search history.

(56) References Cited

U.S. PATENT DOCUMENTS

| | | | | |
|---|---|---|---|---|
| 8,761,594 | B1* | 6/2014 | Gross ................... | H04N 5/2354 396/155 |
| 10,591,285 | B2* | 3/2020 | Ando ................. | G01B 11/2527 |
| 2005/0211876 | A1* | 9/2005 | Thrush ..................... | G02B 3/00 250/208.1 |
| 2006/0000989 | A1* | 1/2006 | Kuriyama ........ | G01N 21/95684 250/559.34 |
| 2007/0019186 | A1* | 1/2007 | Sung .................. | G01N 21/8806 356/237.5 |
| 2010/0091272 | A1* | 4/2010 | Asada .................... | G01N 21/55 356/237.2 |
| 2011/0069154 | A1* | 3/2011 | Case .................. | G01N 21/9501 348/46 |
| 2011/0102575 | A1 | 5/2011 | Case et al. | |
| 2011/0170293 | A1* | 7/2011 | Murai ..................... | F21V 5/007 362/245 |
| 2013/0135513 | A1* | 5/2013 | Choi .................... | A61B 5/0077 348/335 |
| 2014/0372075 | A1* | 12/2014 | Kojima .................. | G01N 21/55 702/167 |
| 2015/0204797 | A1* | 7/2015 | Colle ................. | G01N 21/8851 356/239.4 |
| 2015/0212208 | A1* | 7/2015 | Hanada ............... | H01L 31/0203 250/221 |
| 2016/0112622 | A1* | 4/2016 | Gressum ................ | G03B 15/02 348/370 |
| 2018/0348144 | A1* | 12/2018 | Ando ..................... | G01N 21/55 |

FOREIGN PATENT DOCUMENTS

| | | |
|---|---|---|
| JP | 2001221747 | 8/2001 |
| JP | 2007206797 | 8/2007 |
| JP | 2011233458 | 11/2011 |
| JP | 2014060519 | 4/2014 |
| JP | 2014096253 | 5/2014 |
| JP | 2016013287 | 1/2016 |

OTHER PUBLICATIONS

"Office Action of Japan Counterpart Application", dated Mar. 2, 2021, with English translation thereof, p. 1-p. 9.

* cited by examiner

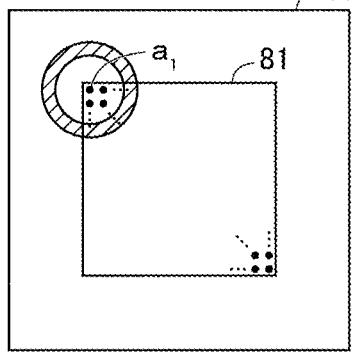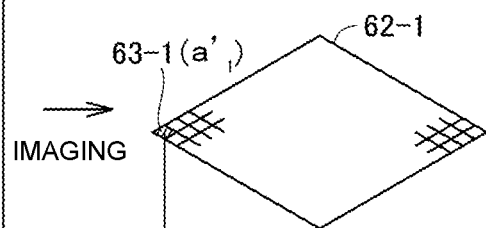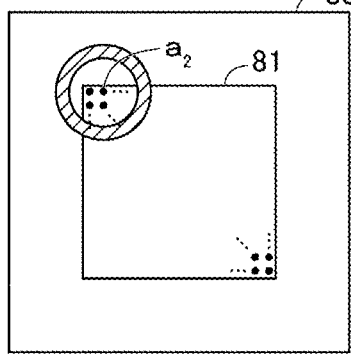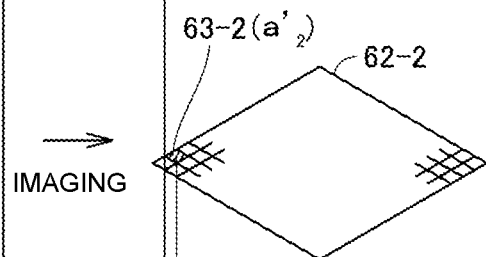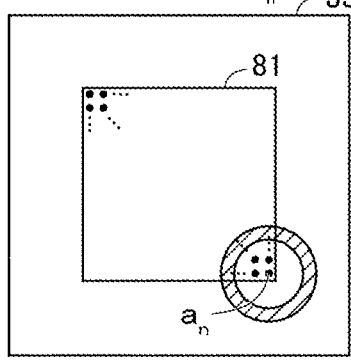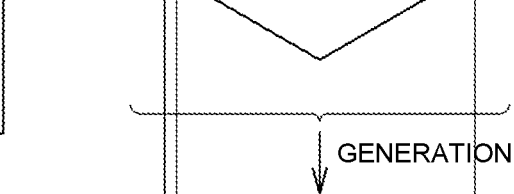
FIG.10

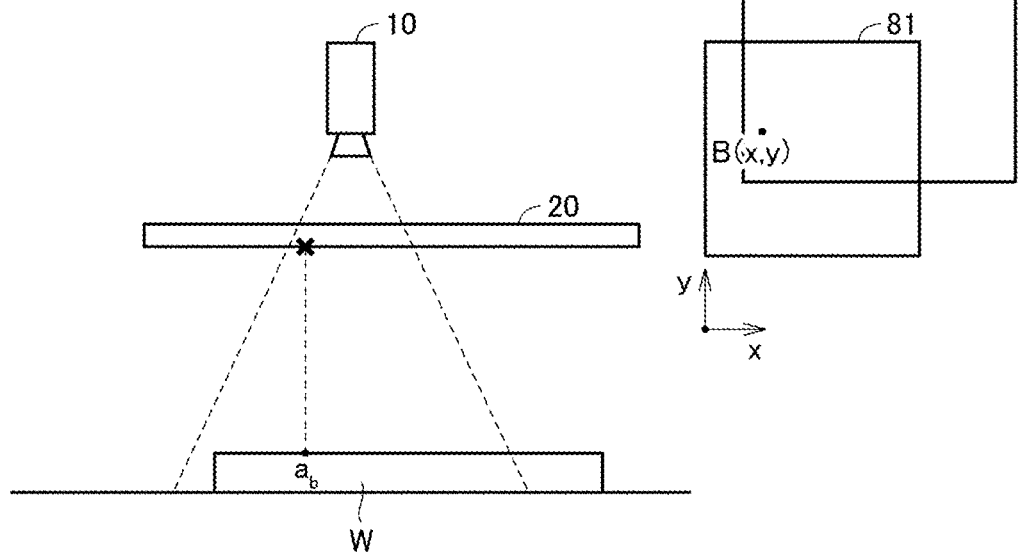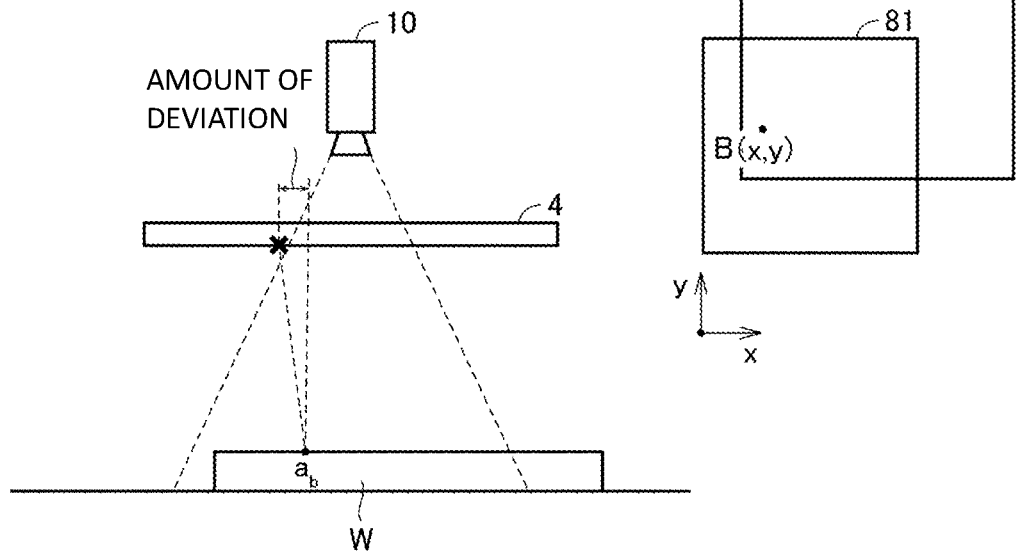
FIG.14

IMAGE INSPECTION DEVICE

CROSS-REFERENCE TO RELATED APPLICATION

This application claims the priority benefit of Japan Application No. 2018-041889, filed on Mar. 8, 2018. The entirety of the above-mentioned patent application is hereby incorporated by reference herein and made a part of this specification.

BACKGROUND

Technical Field

The present technology relates to an image inspection device that inspects an object using a captured image.

Description of Related Art

An image processing technology, in which an object (hereinafter also referred to as a "workpiece") is imaged under illumination of light from an illumination device and information on the workpiece is acquired from generated image data, is used in the factory automation (FA) field or the like.

Except for some 3D sensors such as stereo cameras, image sensors of the related art have a one-to-one relationship or a one-to-many relationship between cameras and illumination devices. An image sensor having a configuration in which a plurality of illuminators are provided for one camera is disclosed, for example, in Japanese Laid-open No. 2007-206797 (Patent Document 1).

Patent Documents

[Patent Document 1] Japanese Laid-open No. 2007-206797

Depending on the shape or size of a workpiece to be imaged, a plurality of cameras may be required to avoid the occurrence of blind spots. In the case of an image sensor of the related art, when a plurality of cameras are used, common usage is that each illumination device always belongs to one of the cameras. That is, cameras and illuminators have a one-to-one relationship or a one-to-many relationship. To prevent an influence from an illuminator at the time of imaging with a camera to which the illuminator does not belong, it is necessary to intentionally shift the timing of light emission of the illuminator.

In addition, in the case of a one-to-one or one-to-many relationship, there is a possibility that illumination devices physically interfere with each other since each illumination device must be assigned to one of a plurality of cameras. In particular, in the case of a surface-emitting type illumination device, interference is likely to occur since the size of the illuminator is large.

Also, there is a method in which an object is illuminated with one illuminator which is always on and is imaged with a plurality of cameras. In this example, cameras and illuminators have a many-to-one relationship. However, in this case, there is a problem that available applications are limited since optimum illumination conditions cannot be set for each camera.

The disclosure to provide an image inspection device which can image an object with a plurality of cameras in a state in which the object is optimally illuminated and which can also be downsized.

SUMMARY

According to an example of the disclosure, an image inspection device for inspecting an object using a captured image includes a plurality of imaging parts configured to image the object, an illumination part that is disposed between the object and the plurality of imaging parts and is configured to radiate light toward the object and has a light-transmissive property, and a control part configured to control the plurality of imaging parts and the illumination part. The illumination part includes a plurality of illumination elements which are arranged in a matrix and are allowed to be turned on independently. The control part is configured to control an irradiation position of the light by controlling turning on and off of the plurality of illumination elements to cause the illumination part to illuminate a region of the object corresponding to a field of view of the plurality of imaging parts and to cause the plurality of imaging parts to image the object.

BRIEF DESCRIPTION OF THE DRAWINGS

FIG. 10 is a diagram illustrating an example of a method of generating inspection image data.

FIG. 14 is a diagram illustrating an example of a result of calibration.

DESCRIPTION OF THE EMBODIMENTS

Figure 1:
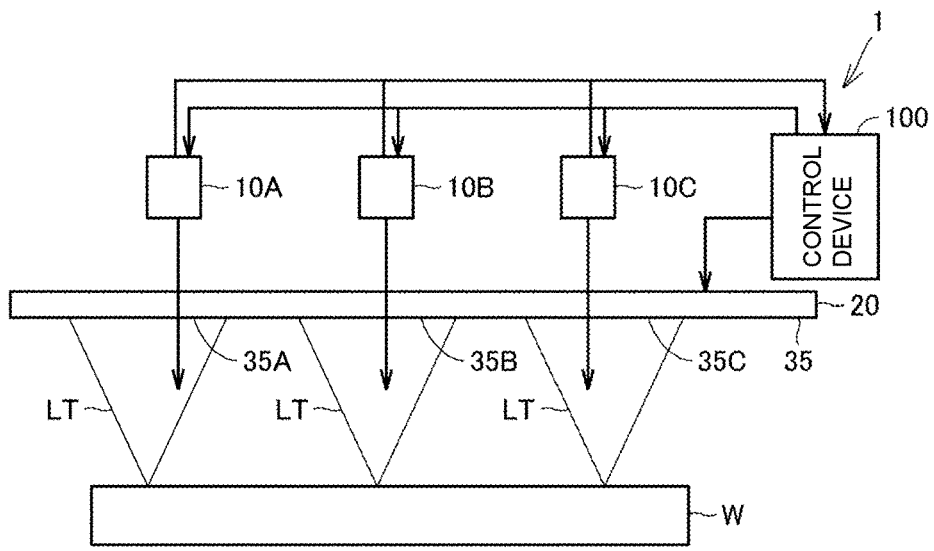
FIG. 1 is a schematic diagram showing the outline of an image inspection device according to the present embodiment.

According to an example of the disclosure, an image inspection device for inspecting an object using a captured image includes a plurality of imaging parts configured to image the object, an illumination part that is disposed between the object and the plurality of imaging parts and is configured to radiate light toward the object and has a light-transmissive property, and a control part configured to control the plurality of imaging parts and the illumination part. The illumination part includes a plurality of illumination elements which are arranged in a matrix and are allowed to be turned on independently. The control part is configured to control an irradiation position of the light by controlling turning on and off of the plurality of illumination elements to cause the illumination part to illuminate a region of the object corresponding to a field of view of the plurality of imaging parts and to cause the plurality of imaging parts to image the object.

According to this disclosure, it is possible to provide an image inspection device which can image an object with a plurality of cameras in a state in which the object is optimally illuminated and which can also be downsized. When an illumination part is provided for each imaging part, a plurality of illumination parts are necessary. However, there is a possibility that the plurality of illumination parts physically interfere with each other. When the plurality of illuminating parts are separated from each other to prevent the occurrence of interference, there arises, for example, a problem that the size of the image inspection device is increased. On the other hand, according to the above disclosure, the illumination part can realize a multi-illumination device having a light-projecting property. Accordingly, each part of the object can be illuminated with an arbitrary irradiation solid angle and each imaging part can image a corresponding part of the object. Thus, it is possible to provide a downsized image inspection device. Illumination of each part of the object by the illumination part may be performed sequentially or may be performed simultaneously.

In the above disclosure, the control part is configured to control turning on and off of the plurality of illumination elements in a time division fashion to cause the illumination part to radiate light of a first irradiation pattern to the object and then then to cause the illumination part to radiate light of a second irradiation pattern to the object. The control part is configured to cause a first imaging part among the plurality of imaging parts to image the object to acquire first image data when light of the first irradiation pattern is radiated to the object and to cause a second imaging part among the plurality of imaging parts to image the object to acquire second image data when light of the second irradiation pattern is radiated to the object.

According to this disclosure, illumination with an arbitrary irradiation solid angle can be realized with a simple configuration.

In the above disclosure, the control part is configured to perform an image measurement process on the object using a plurality of pieces of image data including at least the first image data and the second image data. The first image data is associated with a first target position within an imaging field of view of the first imaging part. The second image data is associated with a second target position within an imaging field of view of the second imaging part. The first irradiation pattern is determined according to the first target position. The second irradiation pattern is determined according to the second target position.

According to this disclosure, the irradiation pattern is determined for each target position within the imaging field of view of each imaging part and therefore an illumination environment corresponding to the target position can be provided. As a result, the accuracy of image measurement can be improved.

In the above disclosure, the first irradiation pattern and the second irradiation pattern are determined such that a direction of incidence of light radiated from the illumination part to the first target position is substantially the same as a direction of incidence of light radiated from the illumination part to the second target position.

According to this disclosure, the direction of incidence of light incident on each target position within the imaging field of view is substantially the same at each target position and therefore the illumination environment at each target position can be substantially the same.

In the above disclosure, the control part is configured to sequentially change an irradiation pattern of light radiated from the illumination part to the object and to cause the plurality of imaging parts to sequentially image the object in accordance with the sequential change of the irradiation pattern.

According to this disclosure, image data captured under different irradiation patterns can be sequentially acquired and image measurement can be performed on the basis of a plurality of pieces of sequentially acquired image data.

In the above disclosure, each of the plurality of imaging parts includes a reading circuit configured to read an image signal from a part of a plurality of light receiving elements configured to convert light included in the imaging field of view into the image signal.

According to this disclosure, an image signal can be read from a light receiving element corresponding to an irradiated target position and therefore it is possible to shorten the time required to read the image signal as compared to the case of reading image signals from all light receiving elements.

In the above disclosure, at least a part of a process of reading a signal from a first light receiving element which is a part of the plurality of light receiving elements and at least a part of a process of exposing a second light receiving element which is a part of the plurality of light receiving elements in a state in which light is being radiated from the illumination part are performed simultaneously.

According to this disclosure, a part of the process of reading the signal and a part of the process of exposing the light receiving element can be performed simultaneously and therefore it is possible to shorten the time required to obtain image data used for image processing.

In the above disclosure, the illuminating part includes a plurality of light emitting portions which are arranged in a matrix and can selectively emit light, and an optical system configured to control an irradiation direction of the light emitted from each of the plurality of light emitting portions such that it is in a direction corresponding to a position of the light emitting portion.

According to this disclosure, the illumination part capable of controlling the light emission position and the irradiation direction can realize a multi-illumination device. It is also possible to simultaneously illuminate each part of the object with an arbitrary irradiation solid angle.

In the above disclosure, the optical system includes a plurality of microlenses provided to face the plurality of light emitting portions, respectively.

According to this disclosure, it is possible to realize an image inspection device which can be downsized.

In the above disclosure, the plurality of microlenses are arranged such that an optical axis of at least a part of the plurality of microlenses deviates from an optical axis of a light emitting portion that faces at least the part of the plurality of microlenses.

According to this disclosure, it is possible to control the irradiation direction of light with a simple configuration.

In the above disclosure, in at least one of the plurality of illumination elements, at least the part of the plurality of microlenses is arranged at a pitch smaller than a pitch of the light emitting portions.

According to this disclosure, it is possible to control the irradiation direction of light with a simple configuration.

In the above disclosure, the plurality of microlenses are arranged such that an optical axis of at least a part of the plurality of microlenses is inclined with respect to an optical axis of a light emitting portion that faces at least the part of the plurality of microlenses.

According to this disclosure, it is possible to control the irradiation direction of light with a simple configuration.

In the above disclosure, the illumination part further includes a light shielding portion configured to shield light that leaks at a periphery of each of the plurality of microlenses among light emitted from the plurality of light emitting portions.

According to this disclosure, it is possible to reduce the possibility that light from the light emitting portion leaks in an unintended direction.

In the above disclosure, the illuminating part has a light emitting surface that is non-planar.

According to this disclosure, a plurality of imaging parts can be arranged suitably when the plurality of imaging parts are installed to surround an object. Further, it is possible to image an object having a curved surface with a plurality of imaging parts in a state in which the object having the curved surface is optimally illuminated.

Advantageous Effects

According to the disclosure, it is possible to provide an image inspection device which can image an object with a plurality of cameras in a state in which the object is optimally illuminated and which can also be downsized.

Embodiments of the disclosure will be described in detail with reference to the drawings. In the drawings, the same or corresponding parts are denoted by the same reference numerals and the description thereof will not be repeated.

A. Exemplary Applications

First, with reference to FIG. 1, an example of a situation in which the disclosure is applied will be described. FIG. 1 is a schematic diagram showing the outline of an image inspection device 1 according to the present embodiment.

The image inspection device 1 according to the present embodiment is applied to a device that images an object (hereinafter also referred to as a "workpiece W") in a production line of an industrial product or the like while illuminating the object and uses an image captured through the imaging to perform visual inspection of the workpiece W (inspection for scratches, dirt, foreign matter, or the like). The image inspection device 1 performs inspection by detecting light reflected by the workpiece W. Therefore, a workpiece having a surface that reflects light is applicable as the workpiece W.

As shown in FIG. 1, the image inspection device 1 includes cameras 10A, 10B, and 10C, an illumination device 20, and a control device 100. The cameras 10A, 10B, and 10C are examples of the plurality of imaging parts. The illumination device 20 is an example of the illumination part. The control device 100 is an example of the control part.

The control device 100 includes, for example, a processor such as a central processing part (CPU) and a microprocessing part (MPU), a random access memory (RAM), a display controller, a system controller, an input/output (I/O) controller, a hard disk, a camera interface, an input interface, a light emitting interface, a communication interface, and a memory card interface. These parts are connected to each other such that they can perform data communication with each other, centering on the system controller.

Each of the cameras 10A, 10B, and 10C images a subject present in the field of view and generates image data as a captured image. The cameras 10A to 10C image the workpiece W, on which visual inspection is to be performed, as a subject through the illumination device 20. In the example shown in FIG. 1, the plurality of cameras 10A to 10C are arranged such that their optical axes are parallel to each other. It is to be noted that, in the present embodiment, the number of cameras is not particularly limited as long as it is more than one. However, in the following disclosure, an example in which the number of cameras is 2 or 3 is mainly shown in view of ease of illustration.

The illumination device 20 is disposed between the workpiece W and the cameras 10A to 10C and radiates light LT toward the workpiece W and also has a light-transmissive property. Therefore, each of the cameras 10A to 10C can image the workpiece W through the illumination device 20.

The illumination device 20 is configured such that it is possible to control the positions of light emission and the directions of light radiation from the light emitting surface 35. The illumination device 20 can irradiate the surface of the workpiece W with light with an optimal irradiation solid angle with respect to the imaging viewpoint of each of the cameras 10A to 10C. As shown in FIG. 1, the illumination device 20 causes a plurality of regions 35A, 35B, and 35C on the light emitting surface 35 to emit light for imaging with the cameras 10A to 10C, respectively. The camera 10A images a part of the workpiece W illuminated by the region 35A of the illumination device 20. The camera 10B images a part of the workpiece W illuminated by the region 35B of the illumination device 20. The camera 10C images a part of the workpiece W illuminated by the region 35C of the illumination device 20.

Figure 2:
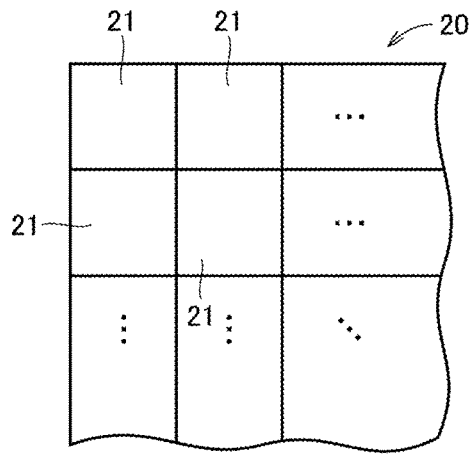
FIG. 2 is a schematic plan view enlarging a part of an illumination device according to the present embodiment.

FIG. 2 is a schematic plan view enlarging a part of the illumination device according to the present embodiment. As shown in FIG. 2, the illumination device 20 includes a plurality of illumination elements 21 arranged in a matrix. That is, the illumination device 20 is partitioned into the plurality of illumination elements 21.

Each illumination element 21 includes a light emitting region and a transparent region. By causing the light emitting region to emit light, the entirety of the illumination element 21 can emit light. On the other hand, each illumination element 21 has a light-transmissive property by having the transparent region.

Returning to FIG. 1, the control device 100 is a control part that controls the cameras 10A, 10B, and 10C and the illumination device 20. The control device 100 controls the turning on and off of the plurality of illumination elements 21 to control the irradiation position of light LT and the irradiation angle of light LT on the surface of the workpiece W. Thereby, the control device 100 causes the illumination device 20 to illuminate regions of the workpiece W corresponding to the fields of view of the plurality of cameras 10A to 10C and causes the plurality of cameras 10A to 10C to image the workpiece.

Figure 3:
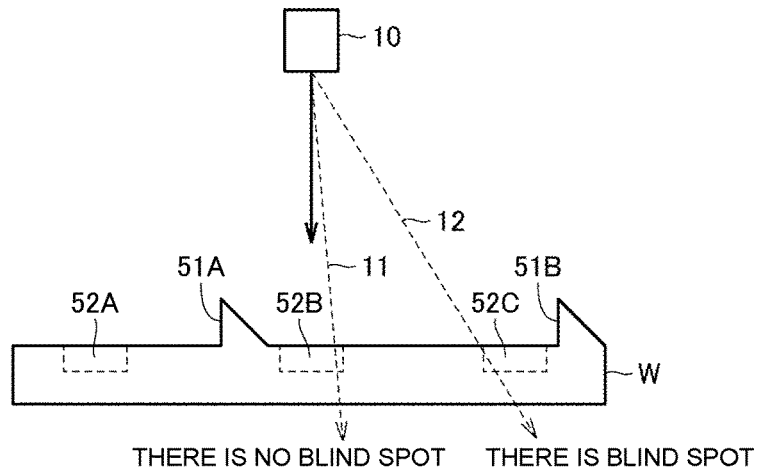
FIG. 3 is a diagram illustrating problems that may occur when a workpiece is imaged with a single camera.

FIG. 3 is a diagram illustrating problems that may occur when a workpiece W is imaged with a single camera. As shown in FIG. 3, for example, protrusions (shown as protrusions 51A and 51B) or recesses (shown as recesses 52A, 52B, and 52C) are present on the surface of the workpiece W. When the camera 10 images the surface of the workpiece W, a blind spot is less likely to occur near the center of the field of view. On the other hand, a blind spot is highly likely to occur at the periphery of the field of view of the camera 10.

In the example shown in FIG. 3, there is the recess 52B in the direction of a line of sight 11. Since there is no blind spot for the camera 10 in this direction, the camera 10 can image the recess 52B. There is the recess 52C in the direction of a line of sight 12. However, since the camera 10 has a blind spot in this direction, it may fail to image the recess 52C.

Furthermore, as can be understood from the direction of the line of sight 11 and the direction of the line of sight 12, the angle of the line of sight differs between both the center and periphery of the field of view of the camera 10. For example, in the case of a part having an inclined surface as exemplified by the protrusions 51A and 51B, an imaged shape of the part may differ from the actual shape depending on the position in the field of view.

Figure 4:
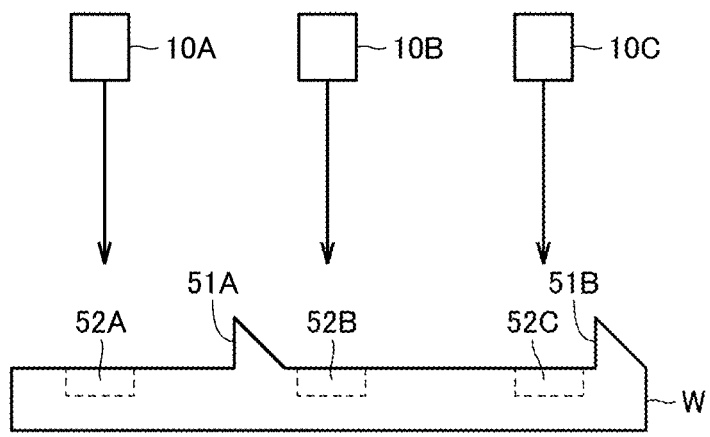
FIG. 4 is a diagram showing a configuration for imaging a workpiece with a plurality of cameras.

Thus, depending on the size or shape of the workpiece W, a plurality of cameras may be needed to avoid the occurrence of blind spots. FIG. 4 is a diagram showing a configuration for imaging the workpiece W with a plurality of cameras.

As shown in FIG. 4, a plurality of cameras 10A, 10B, and 10C are arranged such that their optical axes are parallel to each other. By dividing (sharing) the field of view for (among) the cameras 10A, 10B, and 10C, it is possible to reduce the risk of occurrence of blind spots. Further, when a part having an inclined surface like the protrusion 51A or 51B is imaged, it is possible to reduce the difference between the actual shape and the imaged shape.

Figure 5:
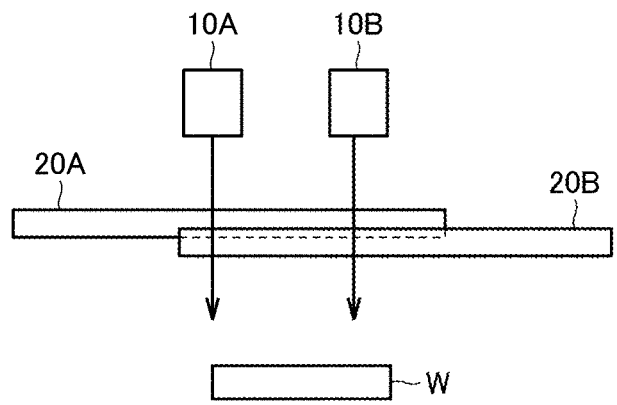
FIG. 5 is a diagram showing a configuration of an image inspection device having a plurality of cameras and a plurality of illumination parts.

When transmissive illumination devices and cameras are in a one-to-one relationship as in the configuration of the related art, the following problem may arise. FIG. 5 is a diagram showing a configuration of an image inspection device having a plurality of cameras and a plurality of illumination parts. In the example shown in FIG. 5, the image inspection device includes cameras 10A and 10B and illumination parts 20A and 20B respectively assigned to the cameras 10A and 10B. Each of the illumination parts 20A and 20B is a transmissive illumination device. Thus, a plurality of pairs of cameras and transmissive illumination devices are provided.

However, it is required that the area of the light emitting surface of each transmissive illumination device be somewhat large to include the field of view of the camera. Therefore, when cameras and illumination devices are in a one-to-one relationship, the illumination parts 20A and 20B physically interfere with each other as shown in FIG. 4. Further, when a workpiece W is illuminated by a general transmissive illumination device, it is difficult to illuminate each part of the workpiece W with an arbitrary irradiation solid angle.

Figure 6:
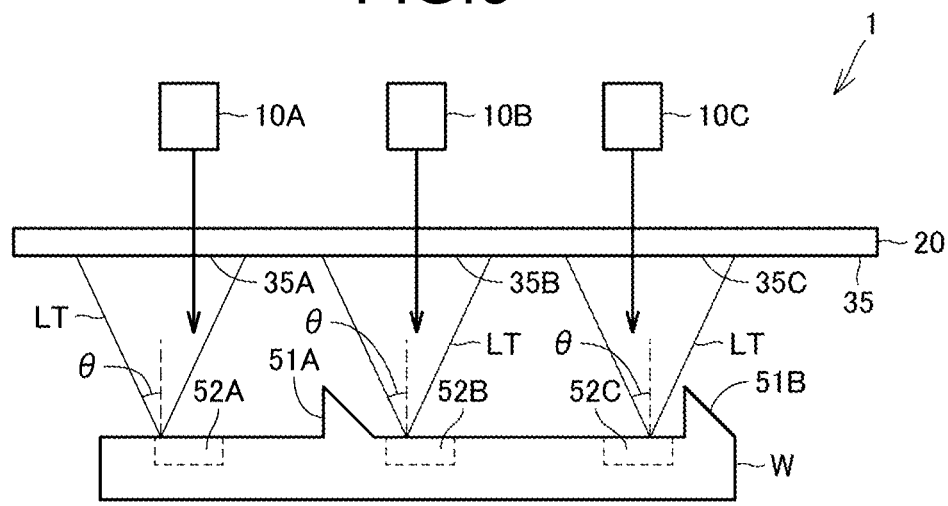
FIG. 6 is a diagram showing illumination of a workpiece by an illumination device included in the image inspection device according to the present embodiment.

FIG. 6 is a diagram showing illumination of the workpiece W by the illumination device 20 included in the image inspection device according to the present embodiment. As shown in FIG. 6, the illumination device 20 radiates light from the regions 35A, 35B, and 35C on the light emitting surface 35. The illumination device 20 can emit light from each region with the same irradiation solid angle θ.

According to the present embodiment, the illumination device 20 capable of controlling the light emission position and the irradiation direction can realize a multi-illumination device. A plurality of cameras share one transmissive multi-illumination device. Therefore, it is possible to avoid the problem of interference between a plurality of transmissive illumination devices. It is also possible to prevent waste of members.

Furthermore, by simultaneously exposing a plurality of cameras to light that is reflected from parts of the workpiece W when the parts are illuminated, it is possible to shorten the imaging time compared to when the parts are serially imaged with the cameras.

In the present embodiment, a method of realizing illumination with an arbitrary irradiation solid angle by controlling the illumination device 20 in a time division fashion and a method of realizing illumination with an arbitrary irradiation solid angle by using a micro optical device can be applied as methods for emitting light with the same irradiation solid angle θ. These methods will be described in detail below.

Figure 7:
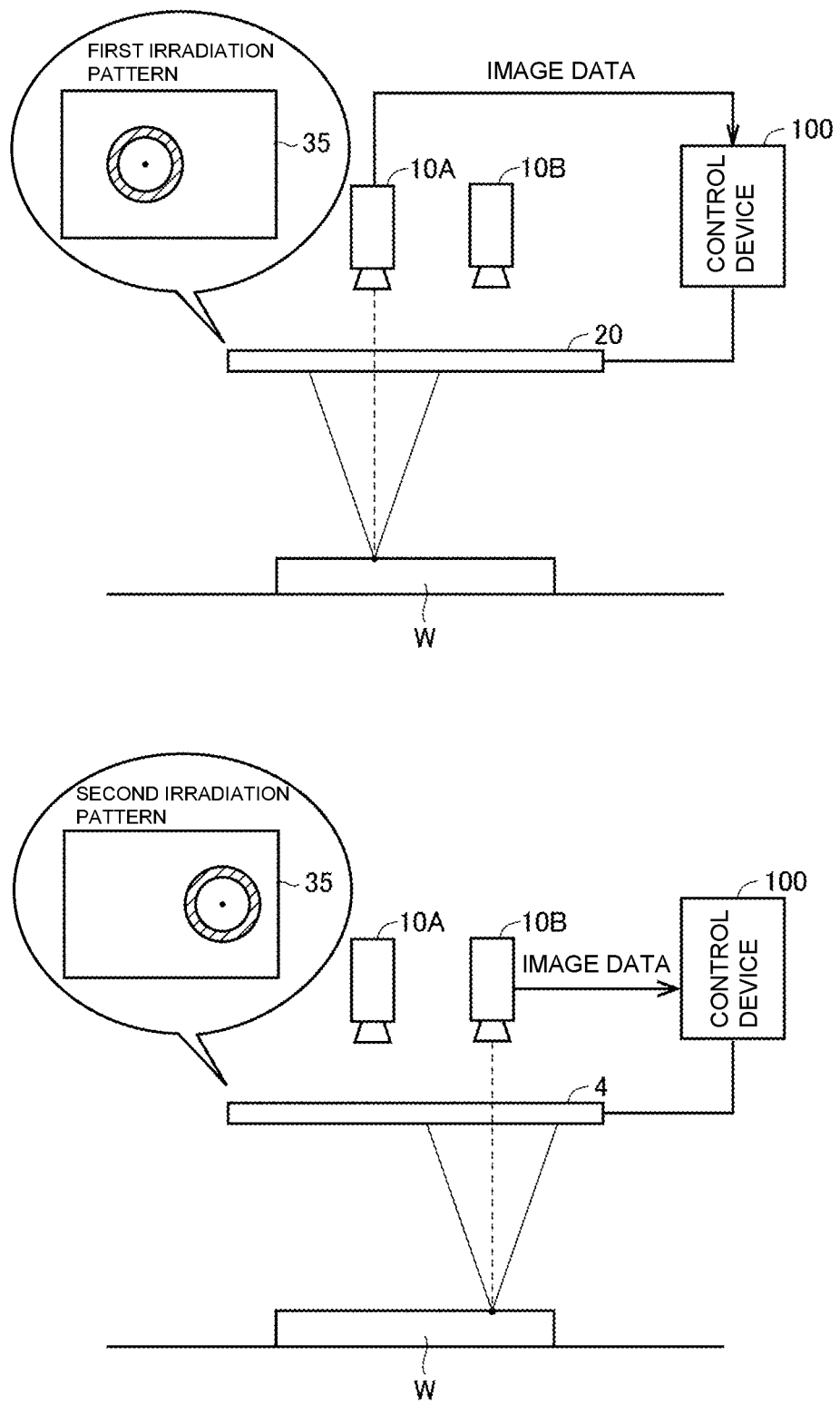
FIG. 7 is a diagram illustrating illumination with an arbitrary irradiation solid angle by time division control of the illumination device.

B. First Embodiment: Illumination with Arbitrary Irradiation Solid Angle Through Time-Division Control of Illumination Device FIG. 7 is a diagram illustrating illumination with an arbitrary irradiation solid angle through time division control of the illumination device. As shown in FIG. 7, the illumination device 20 changes an irradiation pattern in accordance with an instruction from the control device 100. The irradiation pattern is a bright and dark pattern of light radiated on the workpiece W from the illumination device 20. In the present embodiment, the irradiation pattern refers to a distribution pattern of the intensity of light emission from the light emitting surface 35. It is to be noted that the "intensity of light emission" is, for example, the extent of emission of light or the intensity of light, and examples thereof include a luminance ($cd/m^2$) or a luminous intensity (cd).

The control device 100 controls the cameras 10A and 10B such that imaging is performed under their respective irradiation patterns. For example, the control device 100 causes the illumination device 20 to radiate light of a first irradiation pattern to the workpiece W and causes the camera 10A to image the workpiece W in a state in which the first irradiation pattern is radiated to acquire first image data. Further, the control device 100 causes the illumination device 20 to radiate light of a second irradiation pattern to the workpiece W and causes the camera 10B to image the workpiece W in a state in which the second irradiation pattern is radiated to acquire second image data. The control device 100 performs an image measurement process on the workpiece W using a plurality of pieces of image data including at least the first image data and the second image data.

The control device 100 can control the irradiation pattern of light radiated from the illumination device 20 by controlling the turning on and off of the plurality of illumination elements 21 and can cause imaging to be performed under each irradiation pattern to acquire image data. Therefore, it is possible to change the irradiation pattern depending on the shape of a local surface of the workpiece W. Thus, it is possible to provide an image inspection device with high versatility that can be used for any workpiece. For example, an illumination device that cannot change the irradiation pattern needs to adjust the position of illumination and to change the pattern of light to be radiated every time the type of the workpiece placed on the production line changes. On the other hand, the image inspection device according to the present embodiment can change the irradiation pattern through the control device 100. In addition, since imaging is performed under each irradiation pattern to acquire image data, if the type of the workpiece is changed, it is only necessary to change the irradiation pattern and there is no need to adjust the position of the illumination device 20 or the like.

According to the configuration shown in FIG. 7, the overall configuration of the image inspection device can be simplified. When sequential imaging is performed by a plurality of cameras, the total imaging time tends to be long. If the image inspection device has a plurality of pairs of cameras and transmissive illumination devices and the timing of light emission differs among the pairs as shown in FIG. 5, the total imaging time is further prolonged. On the other hand, according to the configuration shown in FIG. 7, the total imaging time can be shortened since the plurality of cameras share one multi-illumination device.

Figure 8:
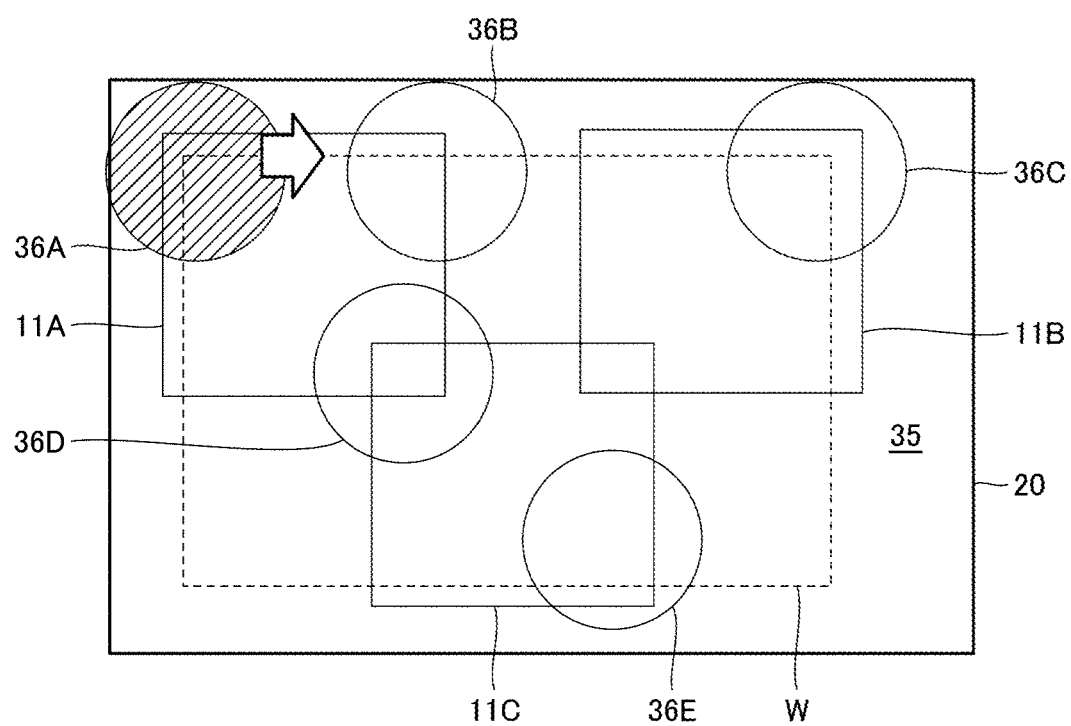
FIG. 8 is a plan view schematically illustrating an arrangement of light emitting regions of the illumination device and the fields of view of a plurality of cameras.

The present embodiment is advantageous, particularly, in the case of an arrangement of cameras in which the fields of view are close to each other and the irradiation solid angle is wide or in which common parts of the fields of view are large as described in the following example. FIG. 8 is a plan view schematically illustrating an arrangement of light emitting regions of the illumination device and the fields of view of a plurality of cameras. FIG. 8 shows a state in which the illumination device 20 and the workpiece W are viewed from above. Fields of view 11A, 11B, and 11C are the field of view of the camera 10A, the field of view of the camera 10B, and the field of view of the camera 10C, respectively. Regions 36A, 36B, 36C, 36D, and 36E indicate light emitting regions on the light emitting surface 35.

In the example of FIG. 8, a part of the field of view 11A and a part of each of the regions 36A, 36B and 36D overlap each other. A part of the field of view 11B and a part of the region 36C overlap each other. A part of the field of view 11C and a part of each of the regions 36D and 36E overlap each other. Further, a part of the field of view 11A and a part of the field of view 11C overlap each other and a part of the field of view 11B and a part of the field of view 11C overlap each other. The overlapping portions of the fields of view 11A and 11C also overlap the region 36D.

Also in such a case, the present embodiment achieves the effect of sharing one transmissive multi-illumination device (the illumination device 20) among a plurality of cameras. Therefore, it is possible to avoid a drastic increase in the total imaging time while a plurality of cameras have a plurality of imaging viewpoints.

(Example of Irradiation Pattern)

Figure 9:
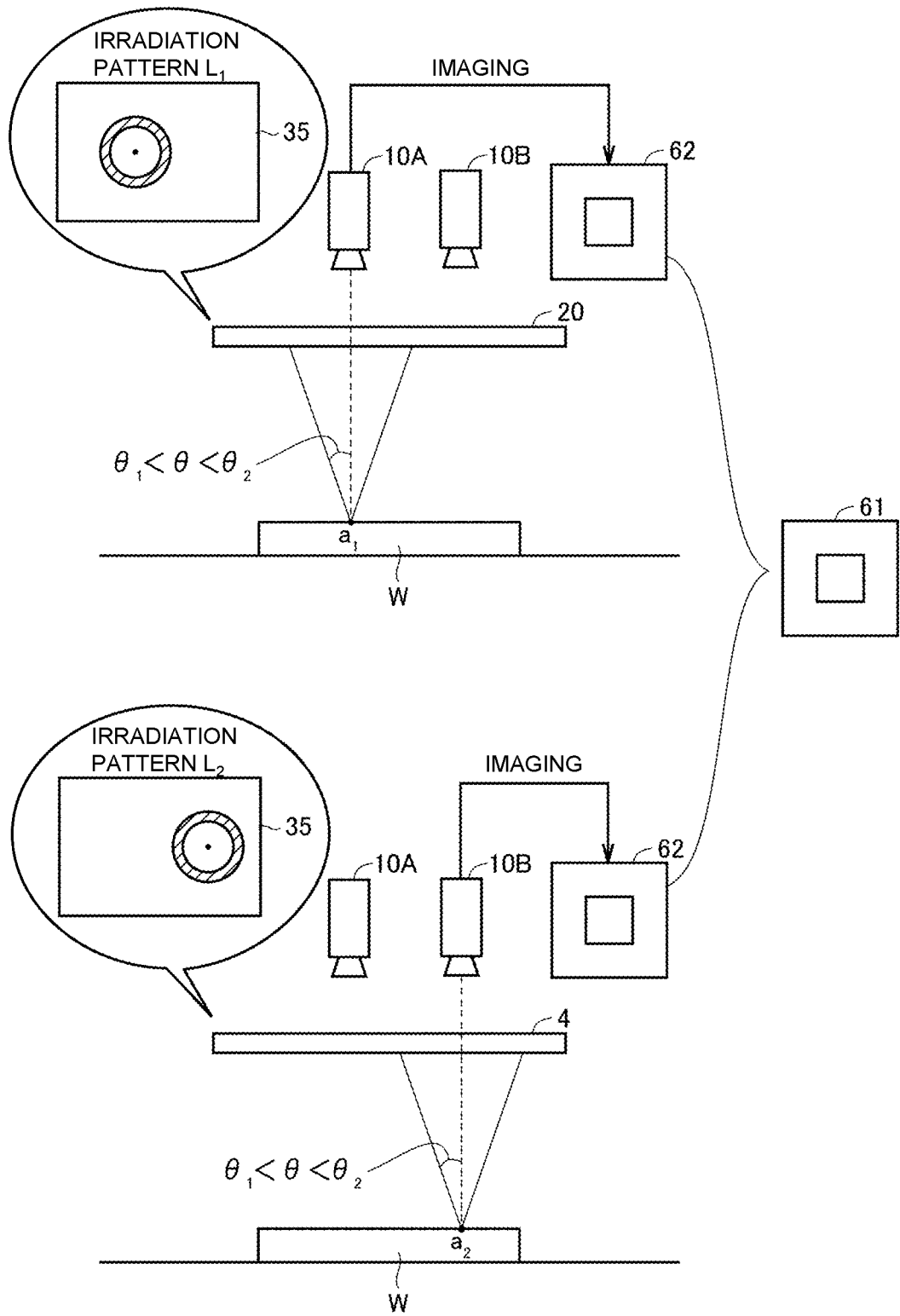
FIG. 9 is a diagram illustrating an example of an irradiation pattern formed by the illumination device.

FIG. 9 is a diagram illustrating an example of the irradiation pattern formed by the illumination device 20. An irradiation pattern is set for each target position a within the imaging field of view of each of the cameras 10A and 10B. Inspection image data 61 used for visual inspection is generated from a plurality of pieces of image data 62 obtained through imaging under the respective irradiation patterns L. Image data at a position corresponding to a target position a in the inspection image data 61 is generated from image data 62 captured under an irradiation pattern L set in association with the target position a.

The irradiation pattern L is determined such that an incident angle θ of light incident on the target position a is substantially the same at any target position a. For example, when an irradiation pattern $L_1$ is set such that the range of the incident angle of light incident on a minute plane including a target position $a_1$ is $θ_1$ to $θ_2$, an irradiation pattern $L_2$ is set such that the range of the incident angle of light incident on a minute plane including a target position $a_2$ is $θ_1$ to $θ_2$. According to the present embodiment, the illumination environment can be made substantially the same for each target position.

(Example of Method of Generating Inspection Image Data)

FIG. 10 is a diagram illustrating an example of a method of generating inspection image data 61. In the example of FIG. 10, target positions $a_1$ to $a_n$ are set as target positions a within an imaging field of view 81. An irradiation pattern L is set for each target position a. The control device 100 (see FIG. 8) acquires a plurality of pieces of image data 62-1 to 62-n, for example, by changing the irradiation pattern L for each target position within the imaging field of view 81 of the camera 10A. FIG. 10 shows this process. Similarly, a plurality of pieces of image data are acquired by changing the irradiation pattern L for each target position within the imaging field of view 81 of the camera 10B. Therefore, one or a plurality of pieces of first image data associated with target positions within the imaging field of view of the camera 10A and one or a plurality of pieces of second image data associated with target positions within the imaging field of view of the camera 10 are obtained.

The control device 100 generates inspection image data 61 from a plurality of pieces of image data acquired from the cameras 10A and 10B. FIG. 10 representatively shows an example in which inspection image data 61 is generated from a plurality of pieces of image data acquired from the camera 10A. The control device 100 generates image data of a position $a'_1$ corresponding to a target position $a_1$ within the inspection image data 61 on the basis of partial image data 63-1 including the position $a'_1$ corresponding to the target position $a_1$ within the image data 62-1. Similarly, the control device 100 generates image data of a position $a'_2$ corresponding to a target position $a_2$ within the inspection image data 61 on the basis of partial image data 63-2 and generates image data of a position $a'_n$ corresponding to a target position $a_n$ within the inspection image data 61 on the basis of partial image data 63-n.

The number of pixels included in the partial image data 63 may be one or more. The range of the partial image data 63 is set according to the distance between the target position a and a target position adjacent to the target position a and is set such that one piece of inspection image data 61 is generated from partial image data 63-1 to 63-n.

When the number of pixels included in the partial image data 63 is more than one, it is possible to reduce the number of times of imaging and the number of times of changing the irradiation pattern. The range of the partial image data 63 may also be set such that pieces of partial image data 63 overlap each other. In this case, pixel information of the overlapping portion is generated on the basis of the pieces of partial image data 63.

In this manner, the irradiation pattern is determined for each target position and inspection image data 61 to be used for image measurement is generated using a plurality of pieces of image data captured under their respective irradiation patterns. That is, image measurement is performed using a plurality of pieces of image data captured under their respective irradiation patterns. Therefore, it is possible to use image data captured under an illumination environment corresponding to the target position and it is possible to improve the accuracy of image measurement.

When the irradiation patterns are determined, if the irradiation pattern $L_1$ is set such that the range of the incident angle of light incident on a minute plane including the target position $a_1$ is $θ_1$ to $θ_2$, then the irradiation pattern $L_2$ is set such that the range of the incident angle of light incident on a minute plane including the target position $a_2$ is $θ_1$ to $θ_2$. Therefore, the illumination environment can be made substantially the same for each target position.

It is to be noted that, in the present embodiment, the control device 100 may not acquire an image signal for generating the image data 62 indicating the entire inside of the imaging field of view 81 from the cameras, and may acquire only image signals for generating the pieces of partial image data 63 from the cameras. That is, the control device 100 may acquire only the partial image data 63-1 to 63-n captured under the irradiation patterns $L_1$ to $L_n$.

(Partial Reading Function)

Figure 11:
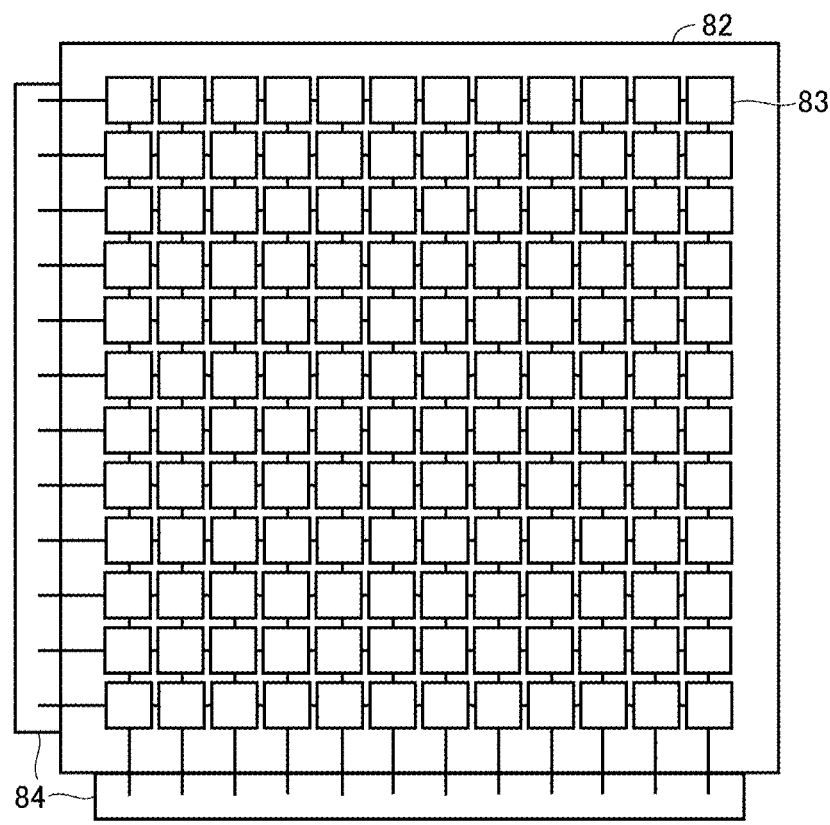
FIG. 11 is a schematic diagram showing a CMOS image sensor.

A partial reading function with which the control device 100 reads only an image signal corresponding to specific image data from each camera will be described. FIG. 11 is a schematic diagram showing a CMOS image sensor. The camera includes a CMOS image sensor 82 that can adopt a partial reading method and a reading circuit 84 that reads a partial region of the CMOS image sensor 82. The CMOS image sensor 82 includes a plurality of photodiodes 83. A partial region of the CMOS image sensor 82 includes one or a plurality of photodiodes 83. Reading a partial region of the CMOS image sensor 82 specifically means reading an image signal from one or a plurality of photodiodes 83 included in the partial region. A photodiode is an example of the "light receiving element," which is not limited to a photodiode as long as it has a function of converting light energy into electric charge.

The control device 100 causes all photodiodes 83 to receive light in a state in which light is being radiated. Thereafter, to acquire partial image data 63 corresponding to the irradiation pattern of light being radiated, a process of reading an image signal from a photodiode(s) 83 corresponding to the partial image data is performed. By providing the partial reading function, it is possible to shorten the time required for reading as compared to the case of reading image signals from all photodiodes 83.

Although a camera having the CMOS image sensor 82 has been described as an example of the camera having the partial reading function, this may also be a camera having a different image sensor such as a CCD image sensor as long as it includes the reading circuit 84.

(Irradiation Pattern Switching Timing and Image Signal Reading Timing)

In the case in which it is possible to start the next exposure of the camera while the camera is reading an image signal, the control device 100 may simultaneously perform at least a part of a process of reading an image signal from a specific photodiode 83 and at least a part of a process of causing the photodiode 83 to receive light. Thus, it is possible to shorten the time required to acquire image signals from all photodiodes 83 since it is possible to perform exposure while a reading process is being performed.

Figure 12:
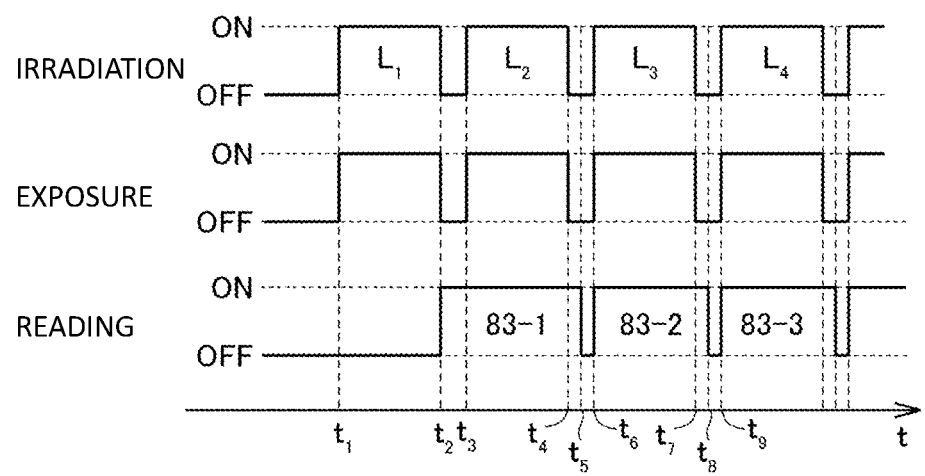
FIG. 12 is a timing chart showing the timing of reading an image signal from each photodiode.

Specifically, how exposure is performed while a reading process is being performed will be described with reference to FIG. 12. FIG. 12 is a timing chart showing the timing of reading an image signal from each photodiode 83. In FIG. 12, it is assumed that an image signal for generating the partial image data 63-1 is read from the photodiode 83-1 and an image signal for generating the partial image data 63-2 is read from the photodiode 83-2. It is also assumed that the partial image data 63-1 corresponds to the irradiation pattern $L_1$ and the partial image data 63-2 corresponds to the irradiation pattern $L_2$. Further, it is assumed that the control device 100 switches the irradiation patterns L in the order of irradiation patterns $L_1, L_2, \ldots L_n$.

A plurality of lines shown in FIG. 12 are, in order from the top of the page, a line indicating the irradiation pattern of light radiated from the illumination device 20, a line indicating whether or not exposure is being performed, and a line indicating whether or not an image signal is being read. The expression "exposure is being performed" means that the photodiode 83 is receiving light and accumulating charge.

The control device 100 allows the photodiodes to be irradiated with light in a state in which light of the irradiation pattern $L_1$ is being radiated, and starts a process of reading an image signal from the photodiode 83-1 at timing $t_2$ at which a predetermined exposure time has elapsed from timing $t_1$ at which exposure of the photodiode 83-1 was started. Next, the control device 100 switches the irradiation pattern $L_1$ to the irradiation pattern $L_2$, allows the photodiodes to be irradiated with light in a state in which light of the irradiation pattern $L_2$ is being radiated, and starts a process of reading an image signal from the photodiode 83-2 at timing $t_5$ at which a predetermined exposure time has elapsed from timing $t_3$ at which exposure of the photodiode 83-2 was started. In this way, at least a part of the process of reading an image signal from a first light receiving element which is a part of the plurality of light receiving elements and at least a part of the process of exposing a second light receiving element which is a part of the plurality of light receiving elements in a state in which light is being radiated from the illumination device 20 are performed simultaneously.

It is to be noted that, when a camera having a CMOS image sensor or a CCD image sensor which does not have the function of starting exposure during reading of an image signal is used, exposure may be started after the reading process is completed. Specifically, exposure may be started after the timing $t_5$ at which the process of reading an image signal from the photodiode 83-1 is completed.

When a camera 10 having an image sensor capable of accumulating charge only in partial photodiodes 83 is used, a photodiode(s) 83 corresponding to the pattern of light being radiated may be caused to accumulate charge and image signals may be read from all photodiodes 83 at the timing at which charge is accumulated in all photodiodes 83. Further, after a photodiode 83 corresponding to the pattern of light being radiated is caused to accumulate charge, a process of reading an image signal from the photodiode 83, a process of switching to the next irradiation pattern, and a process of causing a photodiode 83 corresponding to the next irradiation pattern to accumulate charge may be performed.

(Method of Determining Irradiation Pattern)

Figure 13:
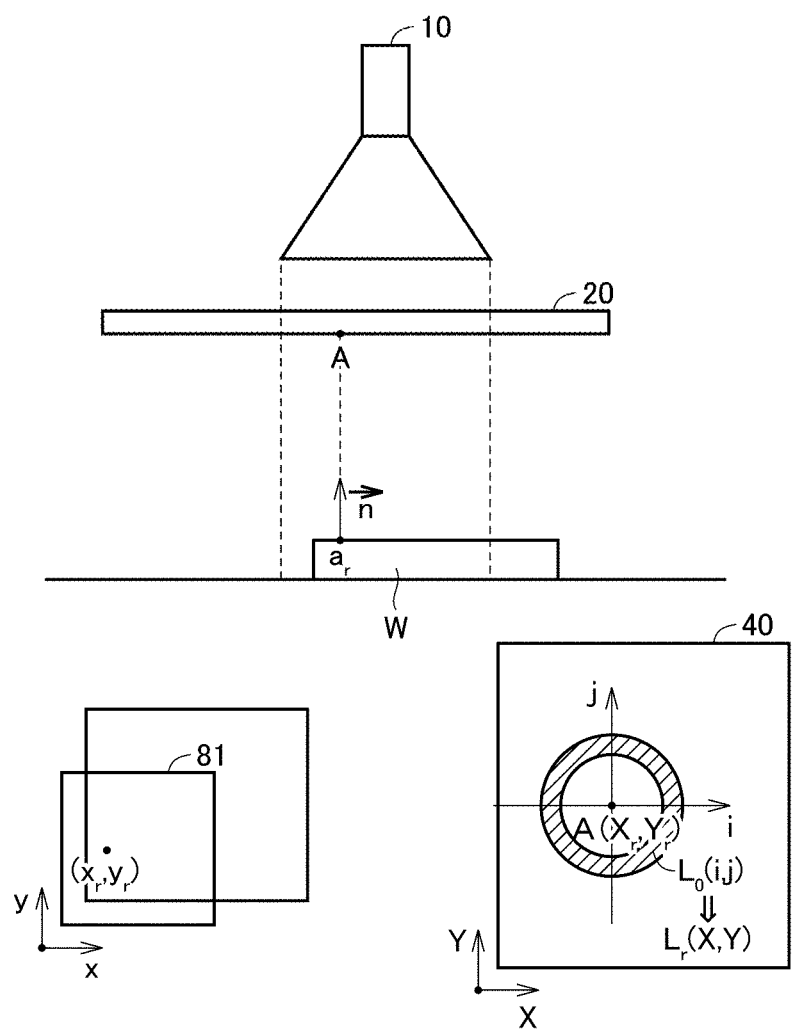
FIG. 13 is a schematic diagram illustrating a method of determining an irradiation pattern for each target position.

FIG. 13 is a schematic diagram illustrating a method of determining an irradiation pattern for each target position. To make the range of the incident angle θ of light incident on the target position a substantially the same at any target position a, in the present embodiment, the irradiation pattern L is determined such that an irradiation pattern $L_0$ centered on a normal line n to a minute plane including the target position a is common for each target position a.

The control device 100 determines an irradiation pattern $L_r$ corresponding to a target position $a_r$. The target position $a_r$ is defined in a camera coordinate system (x, y) defining the imaging field of view 81 of the camera 10 and the position of the target position $a_r$ in the camera coordinate system is $(x_r, y_r)$. FIGS. 13 and 14 show only one camera 10 for ease of explanation.

The intersection A between a normal line $n_r$ to a minute plane including the target position $a_r$ and the light emitting surface 35 is defined in an illumination coordinate system (X, Y) defining the irradiation pattern and the position of the intersection A in the illumination coordinate system is $(X_r, Y_r)$.

For example, the relationship of equation (1) holds between the position of the target position $a_r$ in the camera coordinate system $(x_r, y_r)$ and the position of the intersection A in the illumination coordinate system $(X_r, Y_r)$. Therefore, the position in the camera coordinate system can be converted to the position in the illumination coordinate system.

$$\begin{pmatrix} X_r \\ Y_r \end{pmatrix} = A \begin{pmatrix} x_r \\ y_r \end{pmatrix} + B \tag{1}$$

Coefficients A and B are calibration parameters, which can be calculated through calculation based on the positional relationship between the camera 10 and the illumination device 20 or can be obtained by performing a calibration operation after the positions of the camera 10 and the illumination device 20 are fixed. It is to be noted that when the light emitting surface 35 of the illumination device 20 and the optical axis of the camera are not orthogonal to each other, a known method such as perspective transformation may be used instead of equation (1).

The irradiation pattern $L_r$ is determined by forming an irradiation pattern $L_0$ centered on $(X_r, Y_r)$. Specifically, when a function indicating the shape of the reference irradiation pattern $L_0$ which serves as a reference is defined as $L_0(i, j)$, the irradiation pattern $L_r$ can be expressed as in equation (2).

$$L_r(X-X_r, Y-Y_r) = L_0(i, j) \tag{2}$$

Accordingly, the irradiation pattern $L_r$ at the target position $a_r$ can be obtained from the equations (1) and (2). The camera coordinate system $(x_r, y_r)$ is in correspondence with a plurality of photodiodes (not shown) included in the CMOS image sensor of the camera. To obtain an image signal for generating partial image data including the camera coordinate system $(x_r, y_r)$, the control device 100 controls the illumination device 20 such that the illumination device 20 radiates light with the irradiation pattern $L_r$ and controls the camera 10 such that the camera 10 allows the photodiodes to be exposed. At this time, the control device 100 can specify the irradiation pattern $L_r$ which is to be provided as an instruction to the illumination device 20 from both the camera coordinate system $(x_r, y_r)$ and the reference irradiation pattern $L_O$.

Although it is assumed that a telecentric lens is adopted, a camera using an optical system other than the telecentric lens may be used. In this case, since the camera line of sight and the optical axis of the camera are not parallel to each other, the calibration parameters can be set by performing calibration.

FIG. 14 is a diagram illustrating an example of a result of the calibration. In the example shown in FIG. 14, it is assumed that calibration is performed on the camera 10 having a non-telecentric lens. When the reference object is a diffuse reflection object, the position of an illumination element corresponding to a target position $a_b$ located at a camera coordinate position B(x, y) is located substantially directly above the target position $a_b$.

On the other hand, when the reference object is a specular reflection object, the position of an illumination element corresponding to the target position $a_b$ located at the camera coordinate position B(x, y) deviates from directly above the target position $a_b$. The amount of this deviation increases as the position becomes more distant from the optical axis of the camera.

In the case of a camera 10 having a non-telecentric lens, the camera line of sight is not parallel to the optical axis of the camera, depending on the positional relationship between the camera 10 and the target point on the surface of the workpiece W. In the case of a specular reflection object, the reflection angle of light reflected on a plane including the target position $a_b$ and the incident angle of light incident on the plane including the target position $a_b$ are substantially the same. Therefore, the position of an illumination element corresponding to the target position $a_b$ located at the camera coordinate position B(x, y) is determined such that the angle formed by the intersection of the camera line of sight at the target position $a_b$ and the normal line at the target position $a_b$ is equal to the angle of the reflected light of light radiated from the position of the illumination element corresponding to the target position $a_b$. As a result, the position of the illumination element corresponding to the target position $a_b$ deviates from just above the target position $a_b$.

Figure 15:
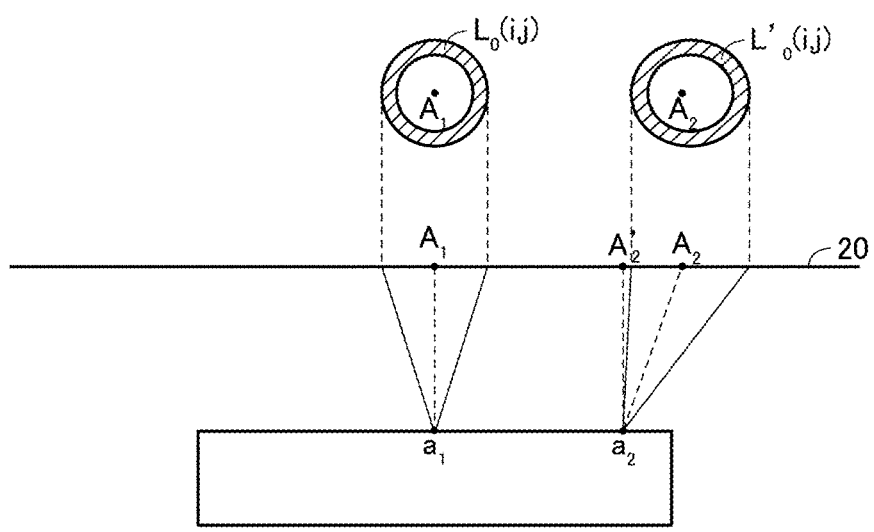
FIG. 15 is a diagram illustrating correction of an irradiation pattern.

When the position of the illumination element corresponding to the target position $a_b$ deviates from just above the target position $a_b$, the reference irradiation pattern $L_O$ may be corrected such that light is radiated with an irradiation pattern different from that when light is radiated directly above the target position $a_b$. FIG. 15 is a diagram illustrating the correction of the irradiation pattern. The position of an illumination element corresponding to the target position $a_1$ is defined as a position $A_1$ and the position of an illumination element corresponding to the target position $a_2$ is defined as a position $A_2$. It is assumed that the position $A_1$ is located substantially directly above the target position $a_1$. It is also assumed that the position $A_2$ is located at a position deviating from a position $A'_2$ substantially directly above the target position $a_2$.

Further, it is assumed that the reference irradiation pattern $L_O$ is the shape of an illumination pattern defined with a position A as the origin when the position A is located substantially directly above a target position a (in the normal direction of the light emitting surface 35) as in the positional relationship between the position $A_1$ and the target position $a_1$.

In this case, the irradiation angle of light incident on the target position $a_2$ when the workpiece is irradiated with an irradiation pattern formed like the reference irradiation pattern $L_O$ centered on the position $A_2$ differs from the irradiation angle of light incident on the target position $a_1$ when the workpiece is irradiated with an irradiation pattern formed like the reference irradiation pattern $L_O$ centered on the position $A_1$. Therefore, it is possible to make the illumination conditions for each target position the same by correcting the reference irradiation pattern $L_O$ to a reference irradiation pattern $L'_O$ according to the positional relationship between the position A of the illumination element and the target position a.

Specifically, the reference irradiation pattern $L_O$ is corrected according to the positional relationship between the position A of the illumination element and the target position a such that a pattern of light incident on the target position a which is centered on a straight line connecting the position A and the target position a is identical at each target position. It is to be noted that the intensity of light incident from the illumination device 20 may also be corrected such that the intensity of light incident on the target position $a_1$ when the target position $a_1$ is irradiated with the reference irradiation pattern $L_O$ and the intensity of light incident on the target position $a_2$ when the target position $a_2$ is irradiated with the reference irradiation pattern $L'_O$ are substantially the same.

Figure 16:
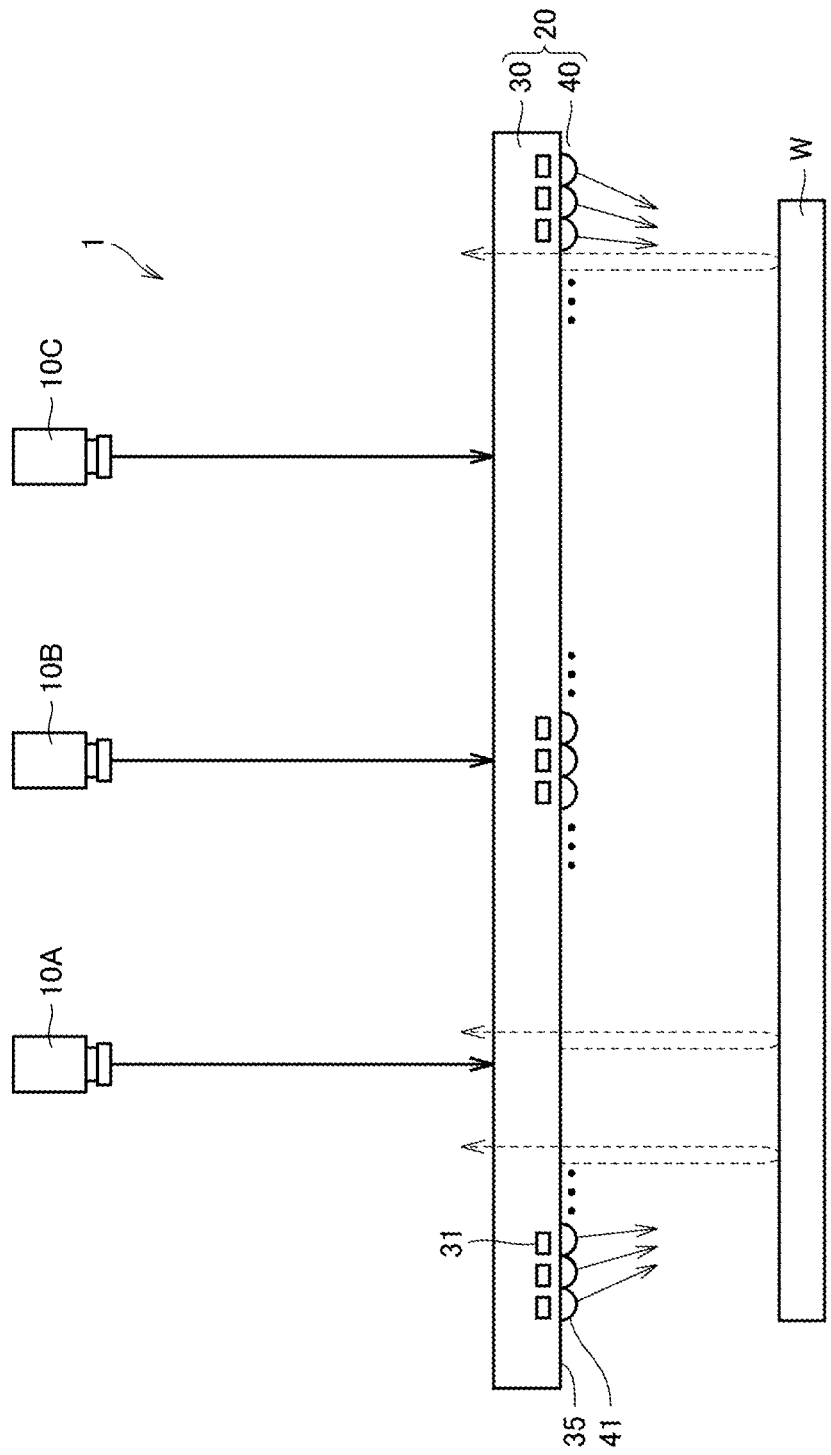
FIG. 16 is a diagram showing a configuration of an illumination device included in an image inspection device according to a second embodiment.

C. Second Embodiment: Simultaneous Illumination with Arbitrary Irradiation Solid Angle by Micro Optical System FIG. 16 is a diagram showing a configuration of an illumination device 20 included in an image inspection device according to a second embodiment. The illumination device 20 includes a surface light source 30 and a microlens array 40 which is an example of the optical system.

The surface light source 30 radiates light toward a workpiece W from a light emitting surface 35 on the workpiece W side of the surface light source 30. Light is radiated from a plurality of light emitting regions arranged in a matrix on the light emitting surface 35 of the surface light source 30. Reflected light from the workpiece W passes through optically transmissive regions other than the light emitting regions on the surface light source 30. The light emitting regions include light emitting portions 31, respectively.

In one example, each of the light emitting portions 31 includes a member formed of an organic electroluminescence (hereinafter referred to as organic EL) material. The plurality of light emitting portions 31 are configured such that they can selectively emit light. As an example, the surface light source 30 is a light source using organic EL. However, the illumination device 20 applicable to the present embodiment is not limited to a light source using organic EL. Any illumination device is applicable to the present embodiment as long as it is transmissive and has a plurality of light emitting portions which are arranged in a matrix and can selectively emit light.

The microlens array 40 is disposed to face the light emitting surface 35 of the surface light source 30. The microlens array 40 includes a plurality of lenses 41 that are provided to face the plurality of light emitting portions 31, respectively. In one example, the lenses 41 are convex lenses. Each of the lenses 41 is configured to guide light emitted from a corresponding light emitting portion 31 in a desired direction. That is, the microlens array 40 is configured to control the irradiation direction of light emitted from each of the plurality of light emitting portions 31 in a direction corresponding to the position of the light emitting portion 31.

By selecting a light emitting portion to be caused to emit light from the plurality of light emitting portions 31, it is possible to arbitrarily change the irradiation solid angle. The light emitting portion to be caused to emit light is selected according to the position in the field of view. Therefore, it is possible to realize an image inspection device 1 capable of arbitrarily setting the irradiation solid angle for each location in the field of view. Furthermore, since the irradiation solid angle can be arbitrarily changed, it is possible to eliminate the need for optical parts such as, for example, a slit or a half mirror. Therefore, it is possible to downsize the illumination device 20.

Figure 17:
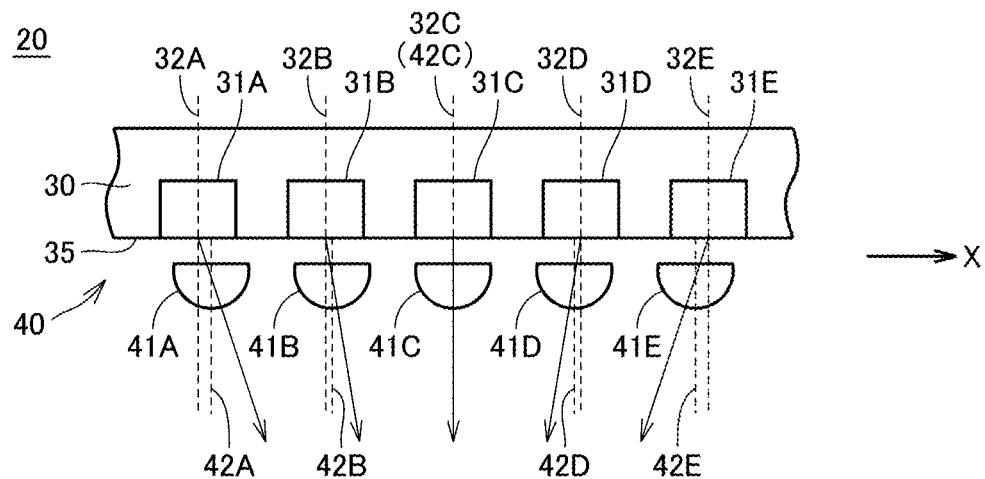
FIG. 17 is a schematic diagram showing a partial cross section of an example of an illumination device according to a second embodiment.
Figure 18:
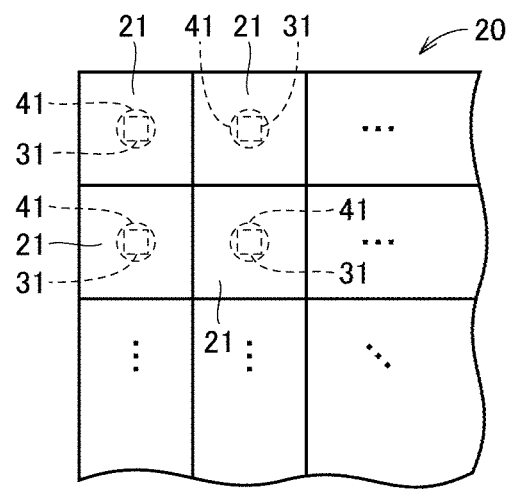
FIG. 18 is a schematic plan view enlarging a part of the illumination device according to the second embodiment.

An example of the configuration of the illumination device according to the present embodiment will be described with reference to FIGS. 17 and 18. FIG. 17 is a schematic diagram showing a partial cross section of an example of the illumination device according to the second embodiment. FIG. 18 is a schematic plan view enlarging a part of the illumination device according to the second embodiment.

The surface light source 30 includes a plurality of light emitting portions arranged in a matrix along the light emitting surface 35. FIG. 17 representatively shows light emitting portions 31A to 31E. Each of the light emitting portions 31A to 31E has a pair of electrodes (not shown) facing each other. By applying a voltage between the pairs of electrodes, these light emitting portions emit light. By selecting an electrode pair to which a voltage is to be applied from the pairs of electrodes, it is possible to select a light emitting portion which is to emit light.

The color of light emitted from each of the light emitting portions 31A to 31E is not limited. For example, the plurality of light emitting portions 31 may emit light of the same color. Alternatively, by combining a light emitting portion that emits red light, a light emitting portion that emits green light, and a light emitting portion that emits blue light, it is possible to realize a light emitting portion capable of changing the color of light.

The microlens array 40 includes a plurality of lenses 41, which are a plurality of microlenses arranged to face the plurality of light emitting portions 31, respectively. The plurality of lenses 41 are arranged in a matrix along the light emitting surface 35. FIG. 17 representatively shows lenses 41A to 41E that face the light emitting portions 31A to 31E, respectively. In one example, each of the lenses 41A to 41E is a planoconvex lens. The plane of the planoconvex lens is directed to the light emitting surface 35. For example, the planoconvex lens may be a hemispherical lens.

Each lens is for controlling the irradiation direction of light emitted from the corresponding light emitting portion. In one embodiment, the relative position of the optical axis of the lens with respect to the optical axis of the light emitting portion is different between the lenses 41A to 41E. The direction of light emitted from the lens is determined according to the direction and amount of deviation of the optical axis of the lens from the optical axis of the light emitting portion. It is to be noted that, in the present embodiment, the optical axis of the light emitting portion means an axis passing through the center point of the light emitting region and perpendicular to the light emitting region, and the optical axis of the lens means an axis passing through the center of the lens and perpendicular to the main surface of the lens.

The optical axis 32C of the light emitting portion 31C substantially coincides with the optical axis 42C of the lens 41C. The optical axis 42A of the lens 41A deviates to the right (in the +X direction) from the optical axis 32A of the light emitting portion 31A. Similarly, the optical axis 42B of the lens 41B deviates in the +X direction from the optical axis 32B of the light emitting portion 31B. The magnitude of the deviation of the optical axis of the lens from the optical axis of the light emitting portion (hereinafter also referred to as the "amount of deviation") is greater in the pair of the light emitting portion 31A and the lens 41A than in the pair of the light emitting portion 31B and the lens 41B.

On the other hand, the optical axis 42D of the lens 41D deviates to the left of the page (in the −X direction) from the optical axis 32D of the light emitting portion 31D. Similarly, the optical axis 42E of the lens 41E deviates in the −X direction from the optical axis 32E of the light emitting portion 31E. The amount of deviation of the pair of the light emitting portion 31E and the lens 41E is greater than that of the pair of the light emitting portion 31D and the lens 41D.

As can be understood from FIG. 17, the irradiation solid angle can be made different by selectively causing one of the light emitting portions 31A to 31E shown in FIG. 17 to emit light. Since the irradiation solid angle can be made different, the restriction of the illumination pattern of the illumination device 20 is reduced. In other words, illumination according to an arbitrary pattern can be realized by the illumination device 20.

As shown in FIG. 18, the illumination device 20 includes a plurality of illumination elements 21 arranged in a matrix. That is, the illumination device 20 is partitioned into a plurality of illumination elements 21. Each illumination element 21 includes a plurality of light emitting portions 31 and a plurality of lenses 41. For example, each illumination element 21 may include light emitting portions 31A to 31E and lenses 41A to 41E shown in FIG. 17. For convenience of illustration, one light emitting portion 31 and a corresponding lens 41 included in each illumination element 21 are shown in FIG. 18.

Each illumination element 21 includes a light emitting region and a transparent region. By causing the light emitting region to emit light, the entirety of the illumination element 21 can emit light. On the other hand, each illumination element 21 has a light-transmissive property due to having the transparent region.

An irradiation pattern of light from the illumination device 20 is determined by illumination elements 21 including light emitting portions 31 which are to emit light (that is, illumination elements 21 to be turned on) among the plurality of illumination elements 21. In an illumination device 20 that can change the wavelength of light emitted from each illumination element 21, the irradiation pattern may be determined by illumination elements 21 to be turned on among the plurality of illumination elements 21 and the wavelength of light radiated from each illumination element 21 to be turned on.

Figure 19:
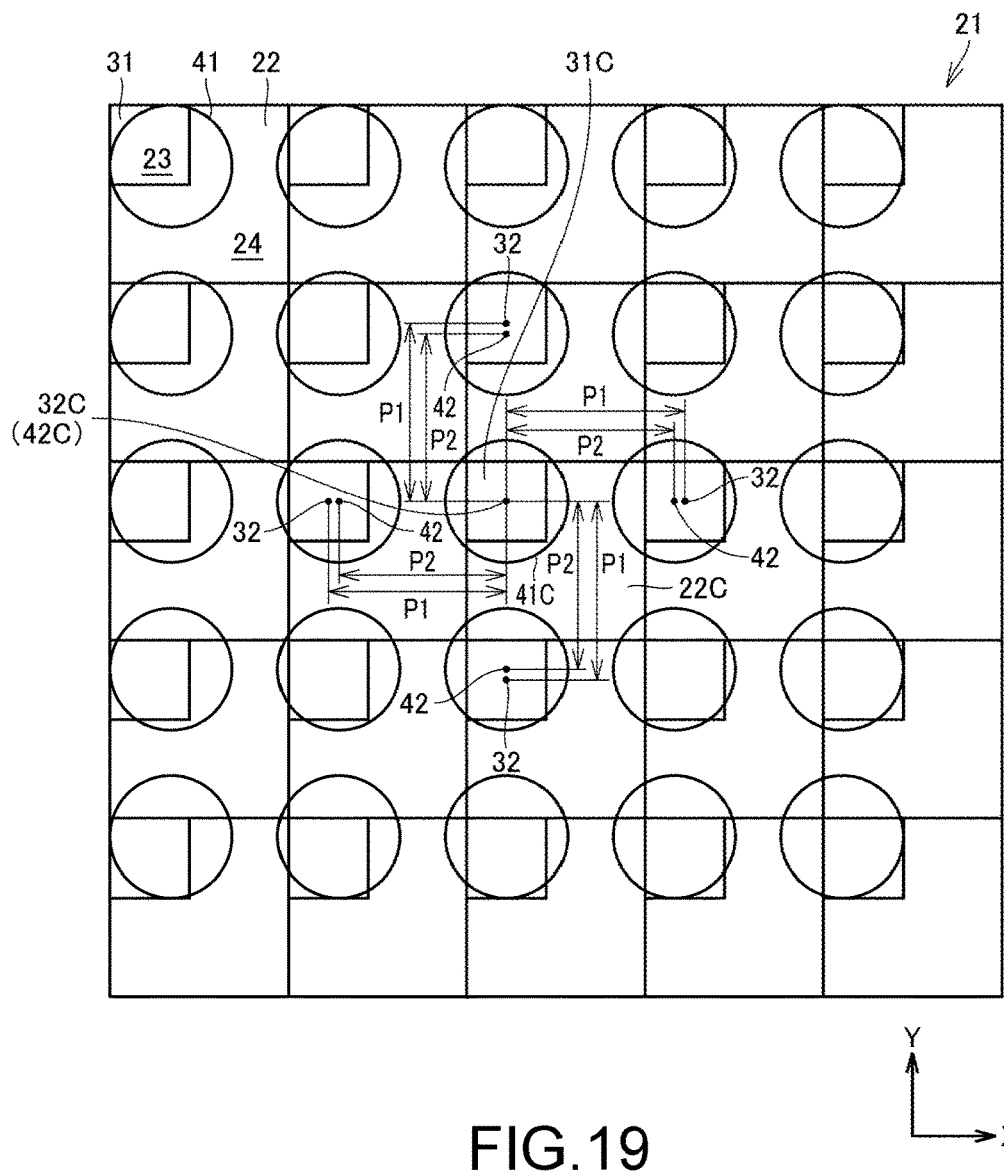
FIG. 19 is a plan view schematically showing an example of a structure of an illumination element which is a constituent element of the illumination device.

FIG. 19 is a plan view schematically showing an example of the structure of an illumination element which is a constituent element of the illumination device 20. FIG. 19 shows a plan view of the illumination element, viewed from the imaging part side (from above the illumination device 20).

The illumination element 21 includes a plurality of cells 22 arranged in a matrix. In the following description, "row" indicates the X direction and "column" indicates the Y direction. FIG. 19 shows an illumination element 21 composed of 25 cells 22 arranged in 5 rows and 5 columns (5×5). However, the number of the cells 22 constituting the illumination element 21 is not particularly limited. For example, the illumination element 21 may be composed of 121 cells 22 arranged in 11 rows and 11 columns (11×11). As the number of the cells 22 increases, the resolution in the irradiation direction of the illumination element 21 can be improved, whereas the resolution in the light emission position decreases. The number of the cells 22 constituting the illumination element 21 can be determined from the resolution of the irradiation direction and the resolution of the light emission position.

Each cell 22 includes a light emitting portion 31, a lens 41, and a transparent region 24. The light emitting surface of the light emitting portion 31 forms a light emitting region in the cell 22.

The plurality of light emitting portions 31 are arranged in the X direction and the Y direction at a first pitch P1. The plurality of lenses 41 are arranged in the X direction and the Y direction at a second pitch P2. Since the second pitch P2 is smaller than the first pitch P1 (P2<P1), the amount of deviation in the X direction between the optical axis 32 of the light emitting portion 31 and the optical axis 42 of the lens 41 for a plurality of cells 22 arranged in the X direction (row direction) follows an arithmetic progression of the difference (P1−P2). Similarly, the amount of deviation in the Y direction between the optical axis 32 of the light emitting portion 31 and the optical axis 42 of the lens 41 for a plurality of cells 22 arranged in the Y direction (column direction) follows an arithmetic progression of the difference (P1−P2).

In FIG. 19, a cell 22C is located at the center of the illumination element 21. The cell 22C includes a light emitting portion 31C and a lens 41C. The optical axis 32C of the light emitting portion 31C and the optical axis 42C of the lens 41C overlap each other in plan view. That is, the amount of deviation in the X direction and the amount of deviation in the Y direction between the optical axis 32C and the optical axis 42C are both 0.

In each cell in the illumination element 21, the amount of deviation in the X direction and the amount of deviation in the Y direction between the optical axis 32 of the light emitting portion 31 and the optical axis 42 of the lens 41 are determined according to the distance in the X direction and the distance in the Y direction between the cell and the center cell 22. Thereby, the irradiation direction of light can be different for each cell 22. The illumination element 21 can radiate light to a workpiece from a plurality of directions. It is also possible to control the irradiation direction of light from the illumination element 21 by selecting a cell to be turned on from the plurality of cells.

In the structure shown in FIG. 19, the pitch of the light emitting portions 31 and the pitch of the lenses 41 are the same in the X direction and the Y direction. However, the pitch of the light emitting portions 31 may be made different in the X direction and the Y direction. Similarly, the pitch of the lenses 41 may be made different in the X direction and the Y direction.

Figure 20:
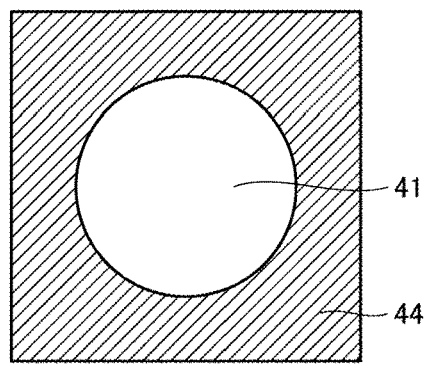
FIG. 20 is a schematic plan view showing a configuration for a countermeasure in response to light leaking at the periphery of a lens.
Figure 21:
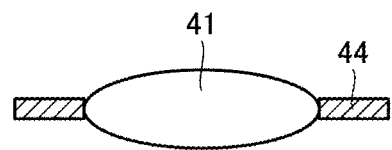
FIG. 21 is a schematic cross-sectional view of the configuration shown in FIG. 20.

There is a possibility that a part of light emitted from the light emitting portion 31 leaks at the periphery of the lens 41 when the amount of deviation (displacement) of the optical axis 42 of the lens 41 from the optical axis 32 of the light emitting portion 31 is great. FIG. 20 is a schematic plan view showing a configuration for a countermeasure in response to light leaking at the periphery of the lens 41. FIG. 21 is a schematic cross-sectional view of the configuration shown in FIG. 20. As shown in FIGS. 20 and 21, a light shielding portion 44 may be provided to surround the periphery of the lens 41. The light shielding portion 44 is made of a member which does not transmit light or a member which attenuates light. With the light shielding portion 44, it is possible to reduce the possibility that light from the light emitting portion 31 leaks in an unintended direction.

Figure 22:
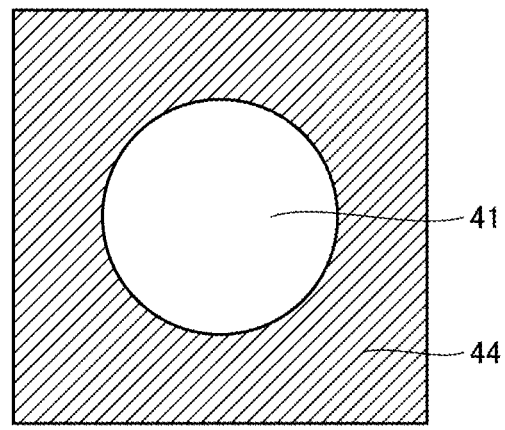
FIG. 22 is a schematic plan view showing one modification of the configuration shown in FIG. 20.

FIG. 22 is a schematic plan view showing one modification of the configuration shown in FIG. 20. In the example shown in FIG. 22, the area of the light shielding portion 44 is greater than that of the configuration shown in FIG. 20. Thereby, it is possible to further reduce the possibility that light from the light emitting portion 31 leaks in an unintended direction.

Figure 23:
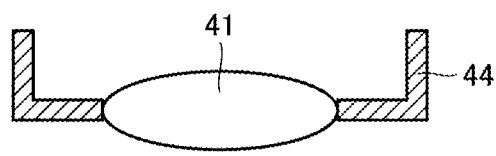
FIG. 23 is a schematic cross-sectional view showing another modification of the configuration shown in FIG. 20.

FIG. 23 is a schematic cross-sectional view showing another modification of the configuration shown in FIG. 20. In the example shown in FIG. 23, in addition to having the configuration shown in FIG. 21, the light shielding portion 44 has a configuration that surrounds the periphery of the lens 41 at a sufficient height along the height (thickness) direction of the lens 41. According to the configuration shown in FIG. 23, it is possible to further enhance the effect of reducing light leaking at the periphery of the lens 41.

(Example of Patterned Illumination)

For imaging of each of the plurality of cameras, the illumination device 20 can irradiate a part of the workpiece W with light through any patterned illumination exemplified below. In the following description, one of the plurality of cameras is representatively shown. Each illumination pattern shown in the drawings described below may be an illumination pattern provided by the entire light emitting surface of the illumination device 20 or may be an illumination pattern provided by a partial region thereof.

Figure 24:
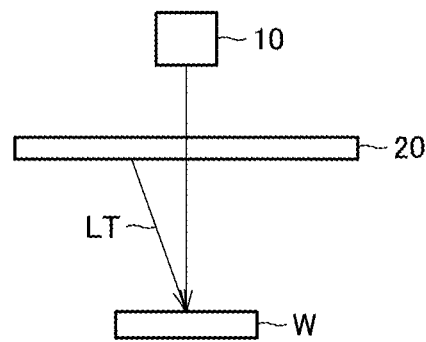
FIG. 24 is a diagram illustrating patterned illumination when a light cutting method is implemented.
Figure 25:
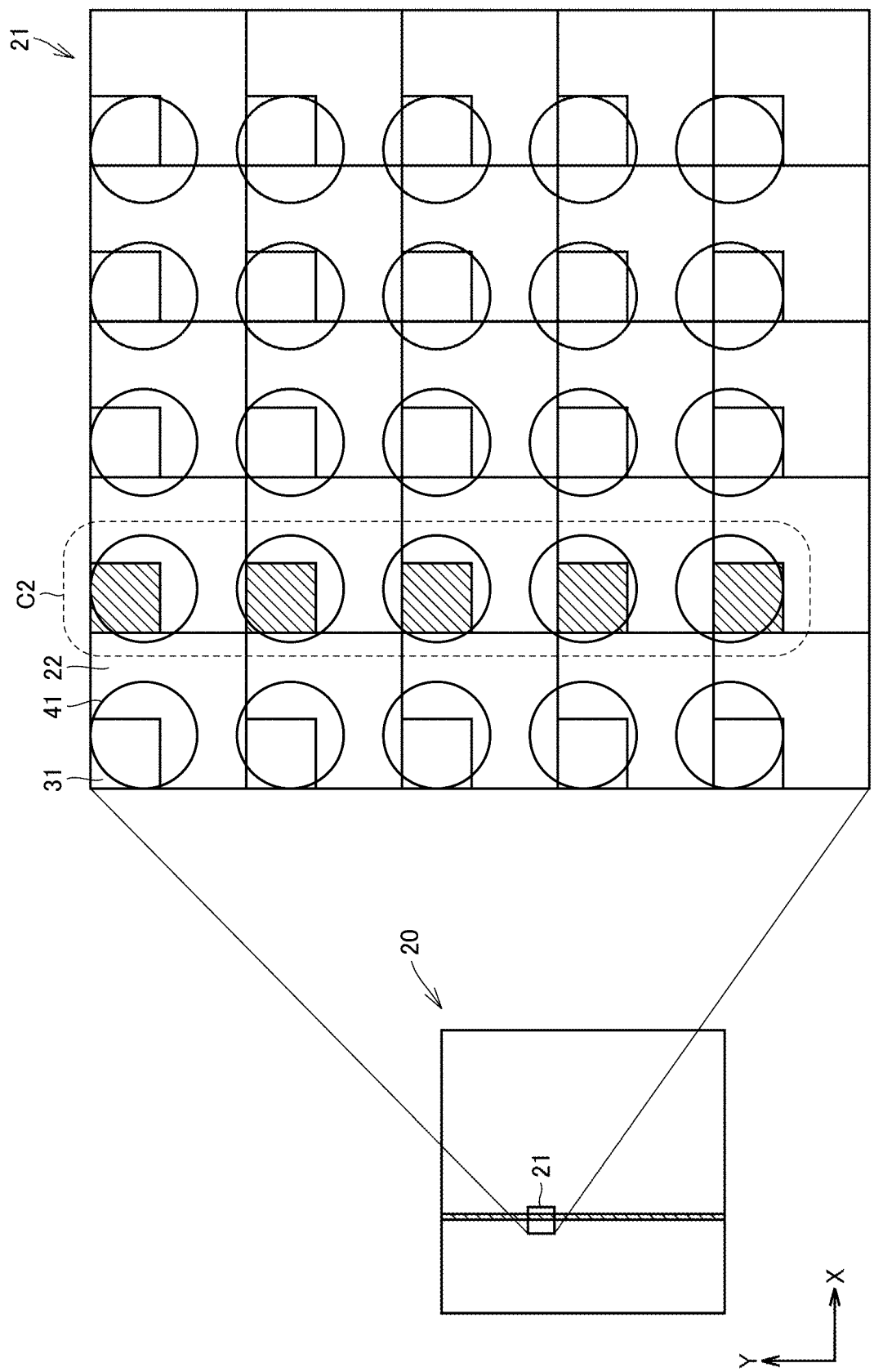
FIG. 25 is a diagram illustrating an illumination pattern of the illumination device for the light cutting method.

FIG. 24 is a diagram illustrating patterned illumination when a light cutting method is implemented. FIG. 25 is a diagram illustrating an illumination pattern of the illumination device for the light cutting method. The light cutting method is applied, for example, when a part of a workpiece to be measured is made of resin or metal. As shown in FIGS. 24 and 25, the illumination device 20 irradiates the workpiece W with light LT of a line-shaped irradiation pattern from a predetermined direction and the camera 10 images the surface of the workpiece W. By applying triangulation to the image, it is possible to obtain height information.

The configuration of the illumination element 21 shown in FIG. 25 and the drawings described below is basically the same as the configuration shown in FIG. 19 and thus a detailed description thereof will not be repeated. As shown in FIG. 25, the illumination device 20 turns on a plurality of illumination elements 21 arranged in the Y direction. In each illumination element 21, light emitting portions 31 arranged in a specific column (for example, column C2) emit light. Thereby, the illumination device 20 can irradiate a desired location on the surface of the workpiece W with line-shaped light along the Y direction from a desired direction. In the above description, the Y direction may be replaced by the X direction. In this case, the illumination device 20 can irradiate a desired place on the surface of the workpiece W with line-shaped light along the X direction.

Figure 26:
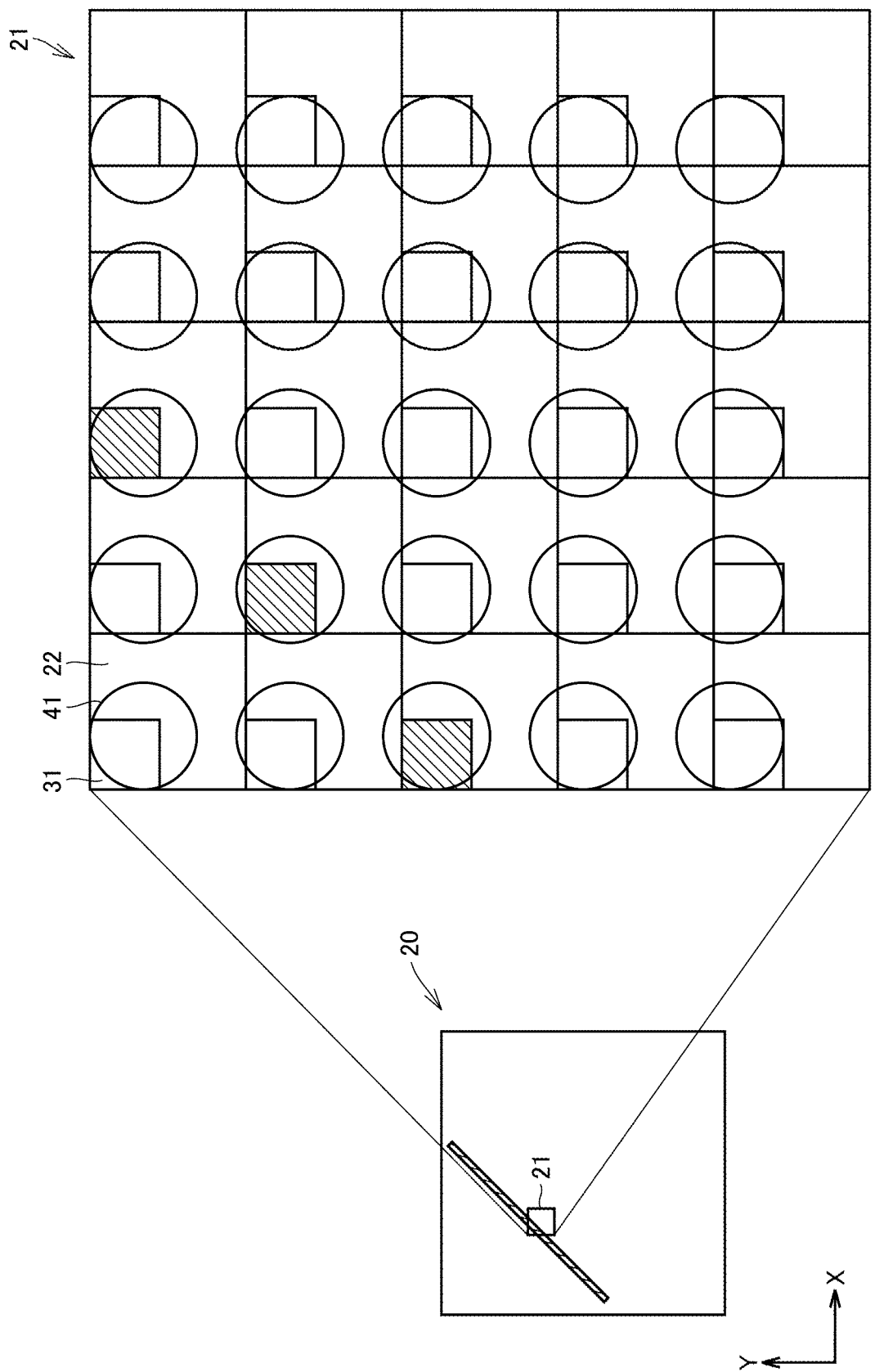
FIG. 26 is a diagram illustrating a modification of the illumination pattern shown in FIG. 25.

FIG. 26 is a diagram illustrating a modification of the illumination pattern shown in FIG. 25. As shown in FIG. 26, the illumination device 20 turns on, for example, a plurality of illumination elements 21 arranged along a direction of 45° with respect to the X and Y directions. In each illumination element 21, a plurality of light emitting portions 31 arranged along a direction of 45° with respect to the X and Y directions emit light. Thereby, it is possible to irradiate the workpiece W with line-shaped light inclined in a direction of 45° with respect to the X and Y directions.

It is to be noted that the workpiece W may be irradiated with light of a plurality of irradiation patterns obtained using combinations of the position on the surface of the workpiece to which light is radiated and the irradiation direction of light. Thereby, it is possible to reduce the number of blind spots for imaging with the camera 10, thus improving the robustness of the inspection. That is, it is possible to improve the accuracy of the inspection.

Figure 27:
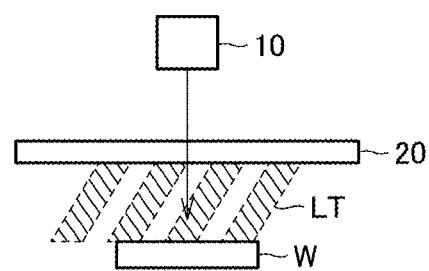
FIG. 27 is a diagram illustrating patterned illumination when a phase shift method is implemented for a diffuse reflection surface.
Figure 28:
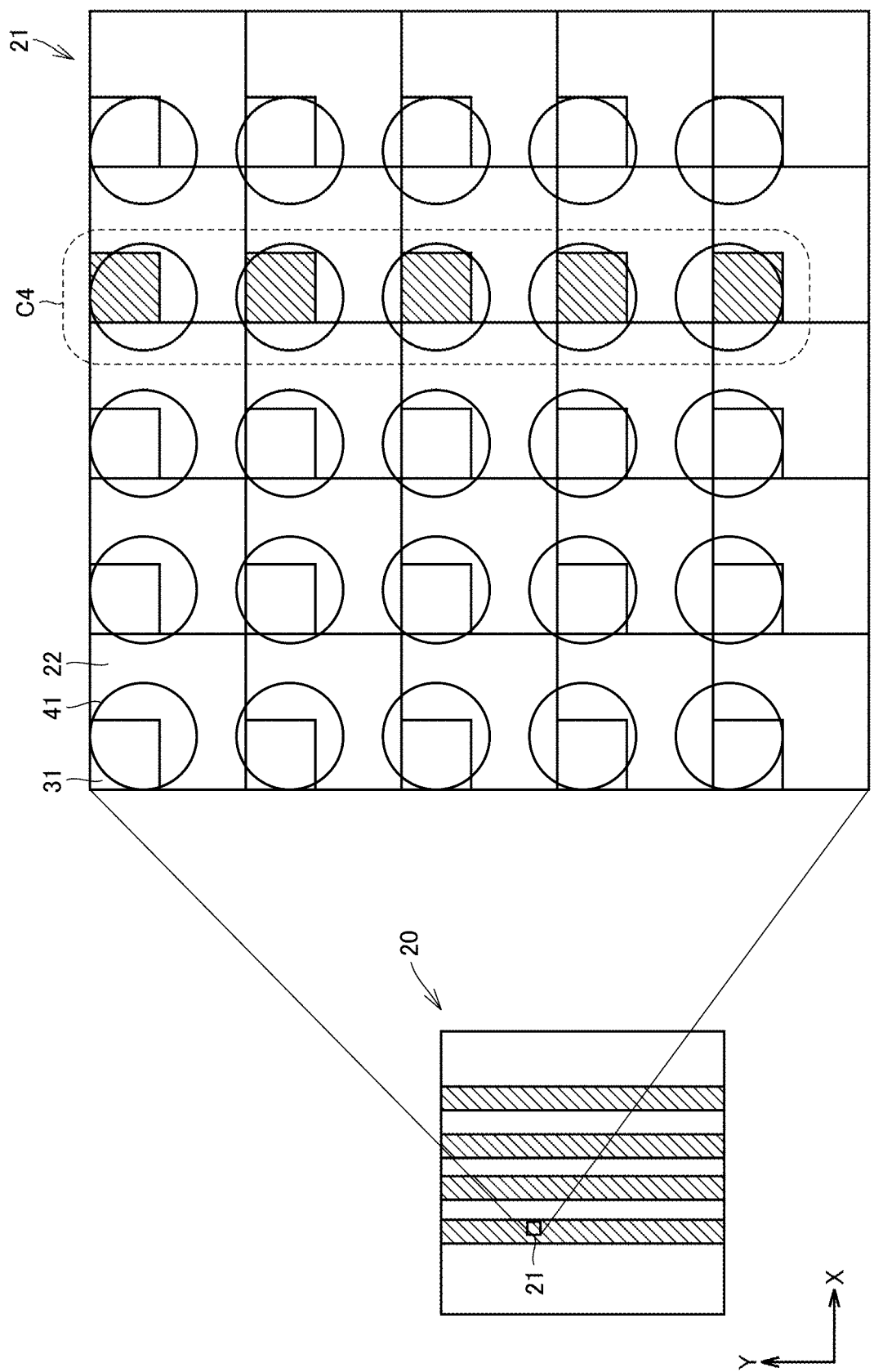
FIG. 28 is a diagram illustrating an example of an illumination pattern of the illumination device for the phase shift method (diffuse reflection) shown in FIG. 27.

FIG. 27 is a diagram illustrating patterned illumination when a phase shift method is implemented for a diffuse reflection surface. FIG. 28 is a diagram illustrating an example of an illumination pattern of an illumination device for the phase shift method (diffuse reflection) shown in FIG. 27. The phase shift method is applied, for example, when a part of a workpiece to be measured is made of resin or metal. As shown in FIG. 27, the illumination device 20 radiates light LT of a striped irradiation pattern from a predetermined direction and the camera 10 images the surface of the workpiece W. When radiating light, the illumination device 20 turns corresponding illumination elements on and off to change the phase of the striped pattern.

As shown in FIG. 28, the illumination device 20 turns on a plurality of columns of illumination elements 21 such that bright and dark zones alternately occur along the X direction. In each illumination element 21, a plurality of light emitting portions 31 arranged in a specific column (column C4 in the example of FIG. 28) emit light. Thereby, the illumination device 20 can emit light of a linear irradiation pattern along the Y direction.

Figure 29:
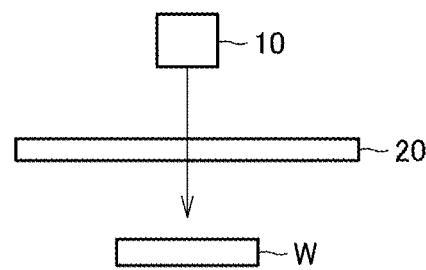
FIG. 29 is a diagram illustrating another example of patterned illumination when a phase shift method is implemented for a diffuse reflection surface.
Figure 30:
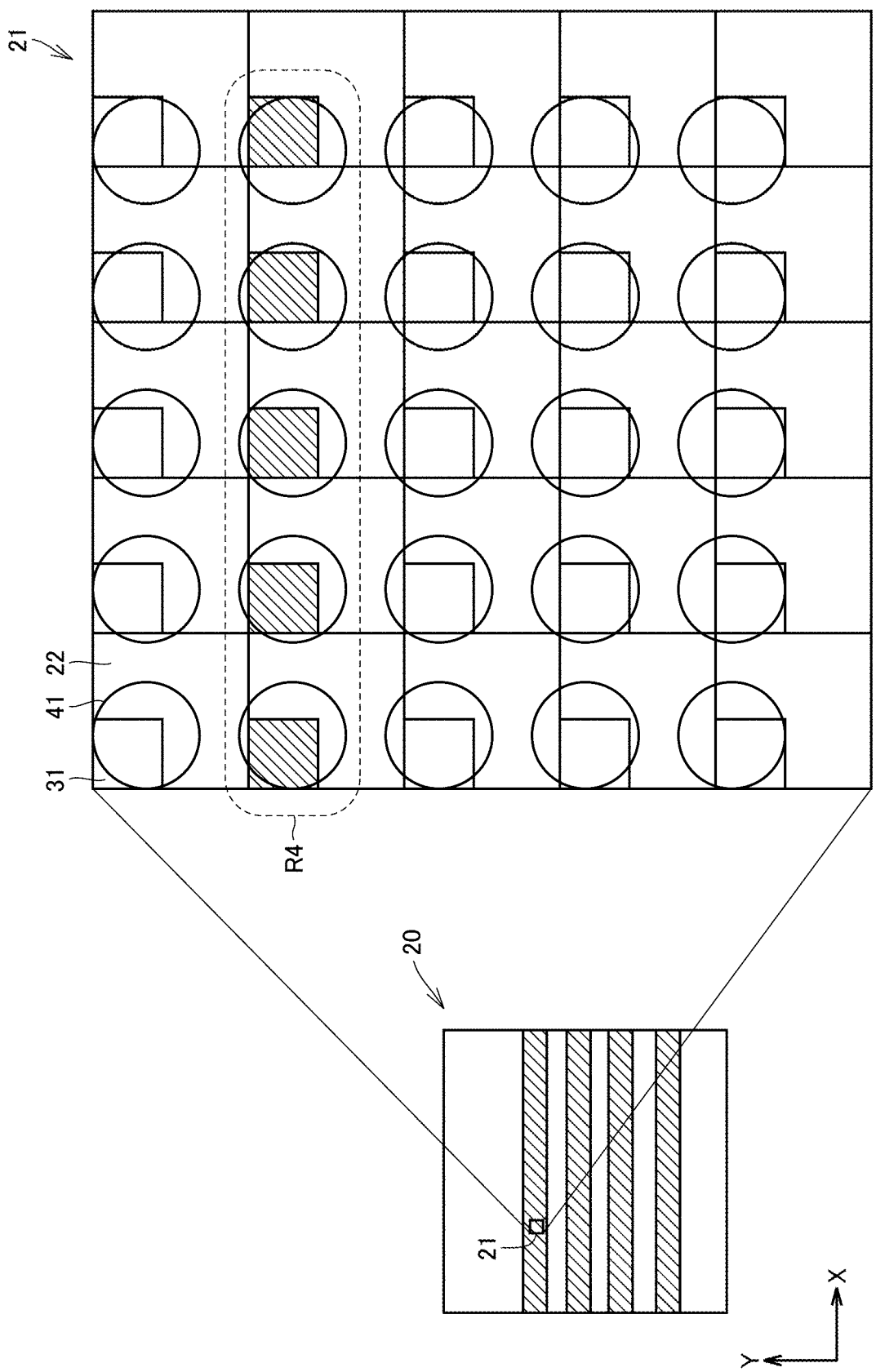
FIG. 30 is a diagram illustrating another example of an illumination pattern of the illumination device for the phase shift method (diffuse reflection) shown in FIG. 29.

FIG. 29 is a diagram illustrating another example of patterned illumination when a phase shift method is implemented for a diffuse reflection surface. FIG. 30 is a diagram illustrating another example of an illumination pattern of the illumination device for the phase shift method (diffuse reflection) shown in FIG. 29. In the example shown in FIGS. 29 and 30, the irradiation patterns shown in FIGS. 27 and 28 are rotated by 90°. Therefore, as shown in FIG. 30, light emitting portions 31 arranged in a specific row (row R4 in the example of FIG. 30) emit light. Thereby, the illumination device 20 can emit light in a linear irradiation pattern along the X direction.

Figure 31:
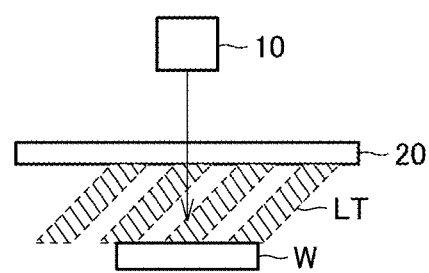
FIG. 31 is a diagram illustrating a modification of the patterned illumination when a phase shift method is implemented for a diffuse reflection surface.
Figure 32:
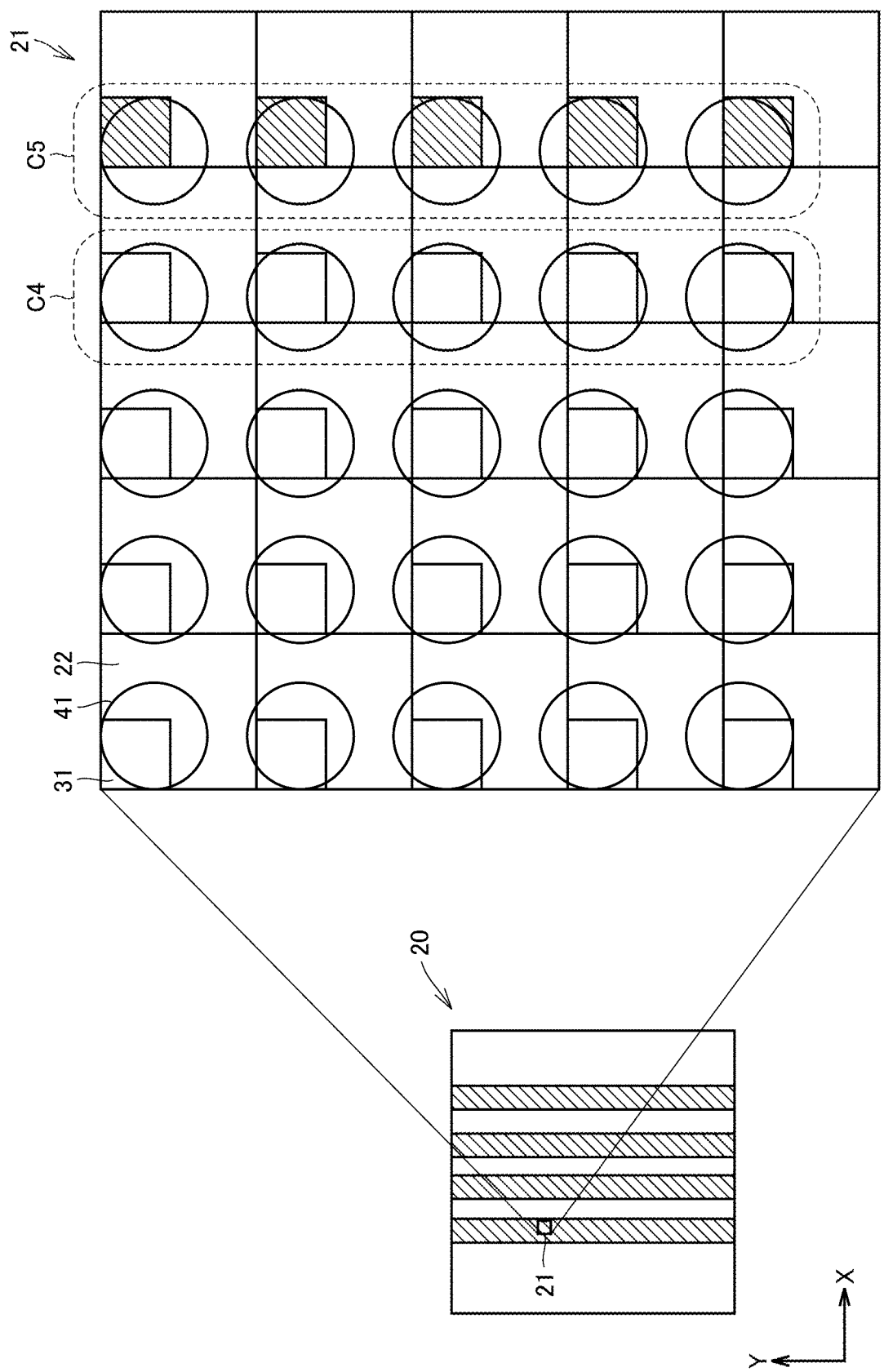
FIG. 32 is a diagram illustrating another example of the illumination pattern of the illumination device for the phase shift method (diffuse reflection) shown in FIG. 31.

It is to be noted that the light emitting portions may be controlled such that their intensity of light emission varies according to a sine wave. FIG. 31 is a diagram illustrating a modification of the patterned illumination when a phase shift method is implemented for a diffuse reflection surface. FIG. 32 is a diagram illustrating another example of the illumination pattern of the illumination device for the phase shift method (diffuse reflection) shown in FIG. 31. In the example shown in FIGS. 31 and 32, light emitting portions 31 arranged in a specific column (for example, column C5) emit light. The column C5 is located outward (in the +X direction) from the column C4 shown in FIG. 28. Therefore, the emission angle of light with respect to the optical axis of the imaging part (the camera 10) increases. In other words, the emission angle of light with respect to the light emitting surface of the illumination device 20 is smaller than that of the irradiation pattern shown in FIGS. 27 and 28.

In the case of phase shift (diffuse reflection), a plurality of emission directions may be combined, similar to the light cutting method. Since it is possible to reduce the number of blind spots for imaging with the camera 10, it is possible to improve the robustness of the inspection.

Figure 33:
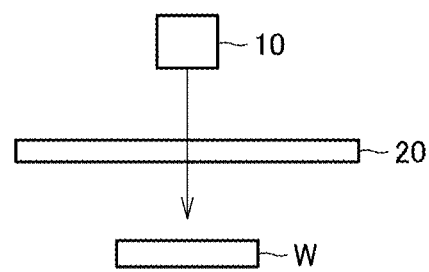
FIG. 33 is a diagram illustrating patterned illumination when a phase shift method is implemented for a workpiece surface on which light is specularly reflected.
Figure 34:
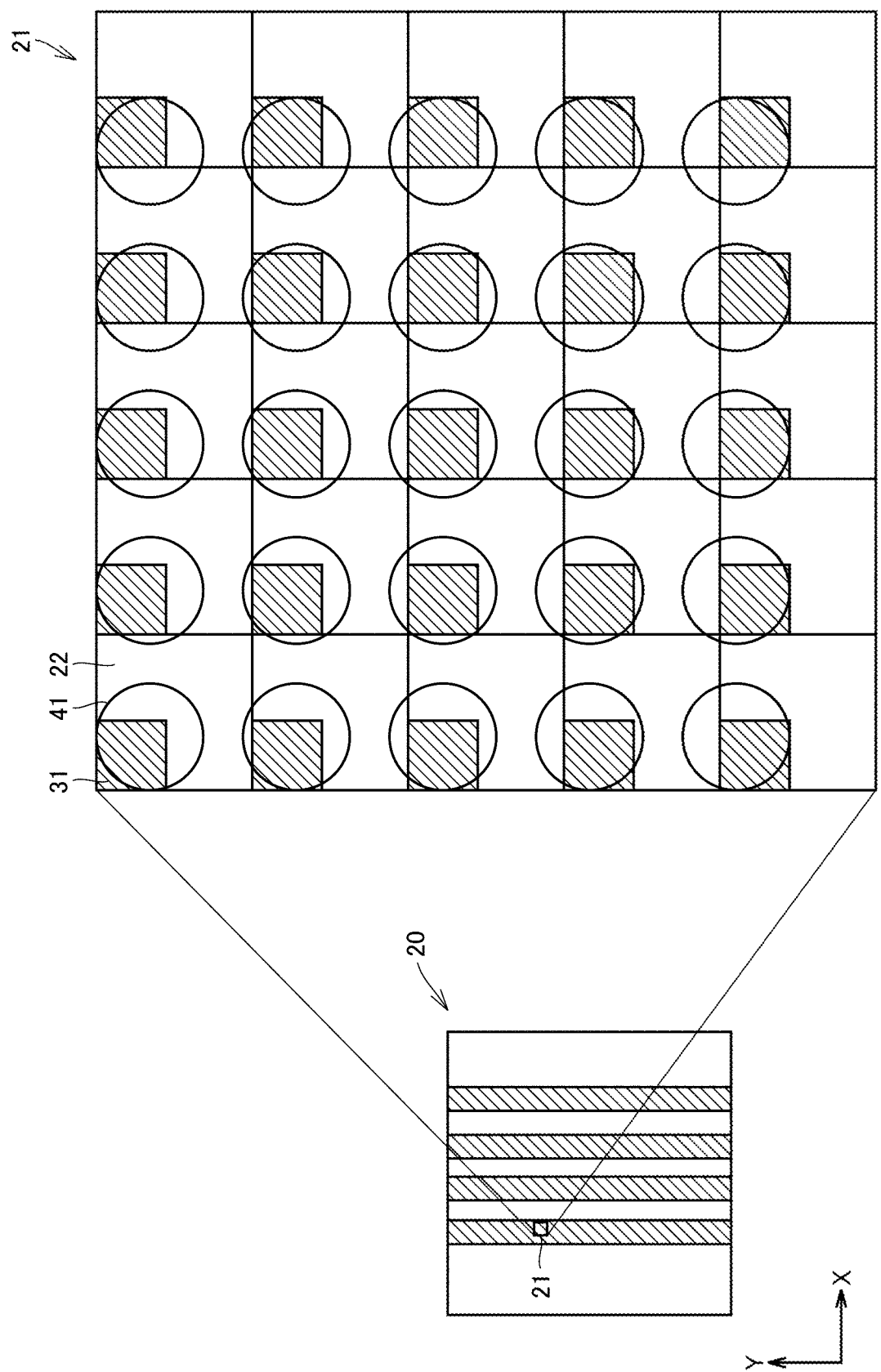
FIG. 34 is a diagram illustrating an example of the illumination pattern of the illumination device for the phase shift method (specular reflection) shown in FIG. 33.

FIG. 33 is a diagram illustrating patterned illumination when a phase shift method is implemented for a workpiece surface on which light is specularly reflected. FIG. 34 is a diagram illustrating an example of the illumination pattern of the illumination device for the phase shift method (specular reflection) shown in FIG. 33. For example, when the surface of the workpiece W is a mirror surface or a glass surface, a phase shift method using specular reflection is applied. As shown in FIG. 33 and FIG. 34, the illumination device 20 radiates light of a striped irradiation pattern from a predetermined direction and the camera 10 images the surface of the workpiece W. In the example shown in FIG. 34, all light emitting portions 31 in each illumination element 21 emit light. Thereby, it is possible to radiate light to the surface of the workpiece from a plurality of directions (which may be regarded as all directions).

Figure 35:
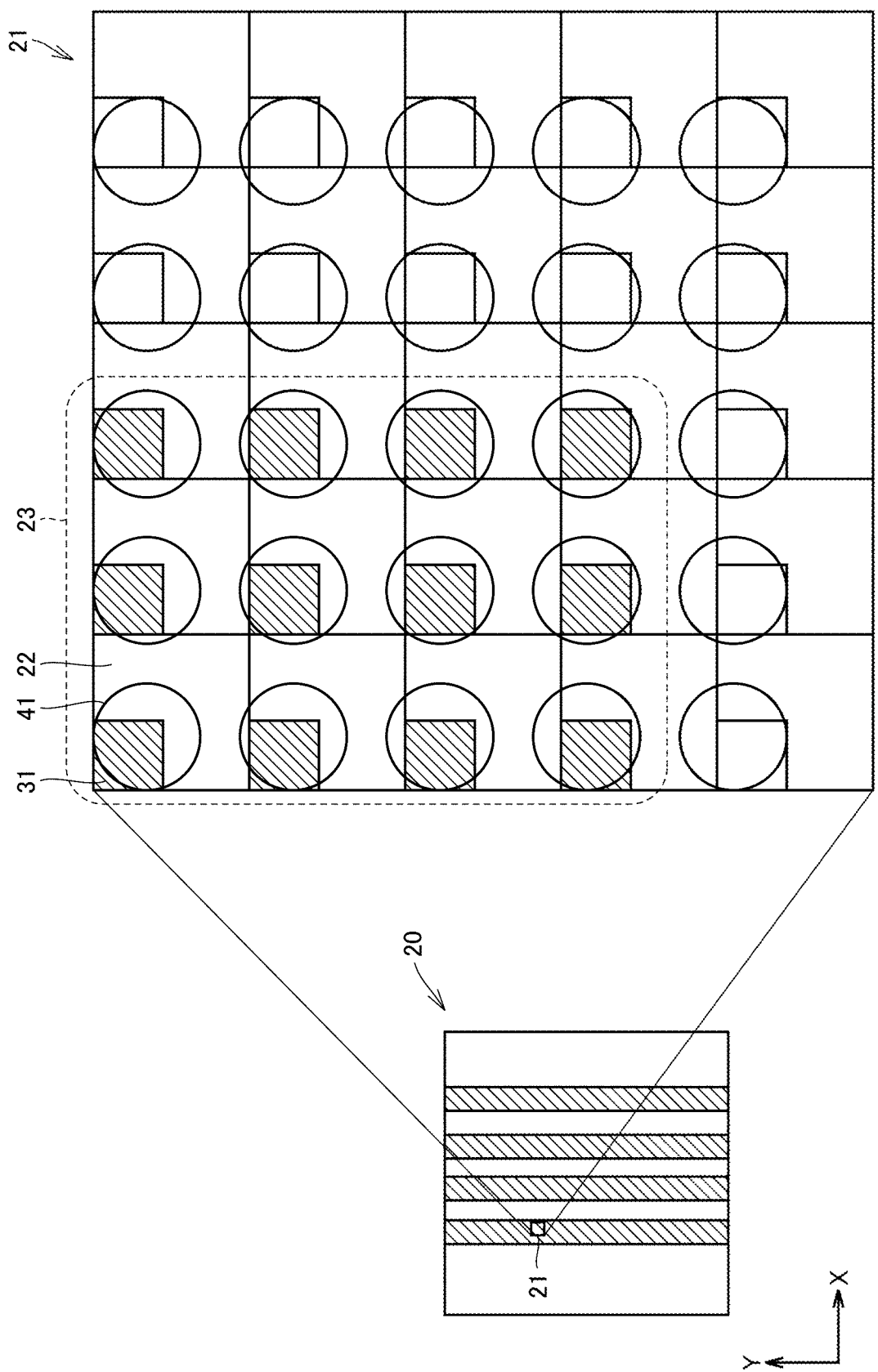
FIG. 35 is a diagram illustrating an example of an illumination pattern for limiting a light emitting direction or a light emitting region.

In each illumination element 21, the light emitting direction or the light emitting region may be limited. In this case, it is possible to reduce components that diffuse and reflect on the surface of the workpiece W, and therefore the S/N ratio can be improved in imaging with the camera 10. FIG. 35 is a diagram illustrating an example of an illumination pattern for limiting the light emitting direction or the light emitting region. As shown in FIG. 35, of the 25 light emitting portions, only twelve (=4×3) light emitting portions 31 belonging to a region 23 specified on the upper left of the page may emit light.

Figure 36:
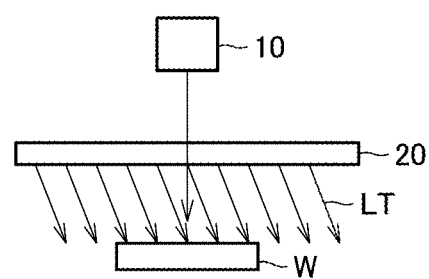
FIG. 36 is a diagram illustrating patterned illumination when a luminance difference stereo method is implemented.
Figure 37:
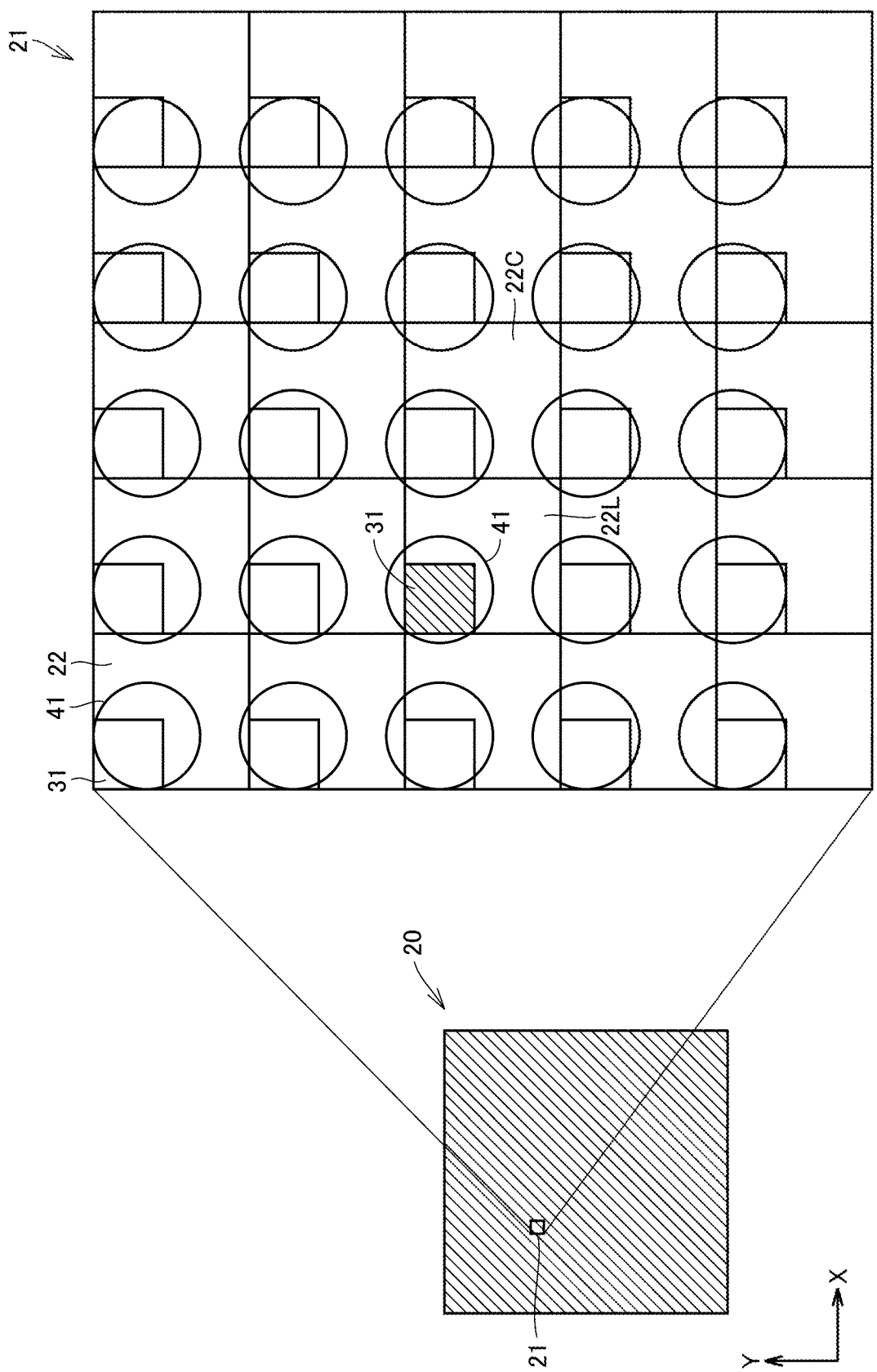
FIG. 37 is a diagram illustrating an example of an illumination pattern for light irradiation shown in FIG. 36.

FIG. 36 is a diagram illustrating patterned illumination when a luminance difference stereo method is implemented. In the luminance difference stereo method, the normal line to the surface of the workpiece W is estimated from a plurality of images captured by switching the illumination direction. For example, the illumination device 20 irradiates the workpiece W with light LT obliquely from the left above the surface of the workpiece W. FIG. 37 is a diagram illustrating an example of the illumination pattern for light irradiation shown in FIG. 36. As shown in FIG. 37, all illumination elements 21 of the illumination device 20 are caused to emit light. In each illumination element 21, a light emitting portion 31 of a cell 22L on the left side (a next cell in the −X direction) of a center cell 22C emits light. The same is true for cells emitting light in other illumination elements 21. Therefore, light LT is radiated obliquely from the left above the surface of the workpiece W.

Figure 38:
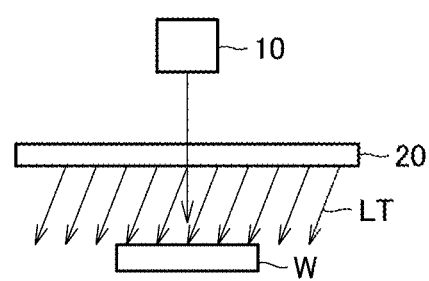
FIG. 38 is a diagram illustrating another patterned illumination when a luminance difference stereo method is implemented.

FIG. 38 is a diagram illustrating another patterned illumination when a luminance difference stereo method is implemented. In the luminance difference stereo method, imaging is performed by changing the illumination direction as described above. In the example shown in FIG. 38, the illumination device 20 irradiates the workpiece W with light LT obliquely from the right above the surface of the workpiece W.

Figure 39:
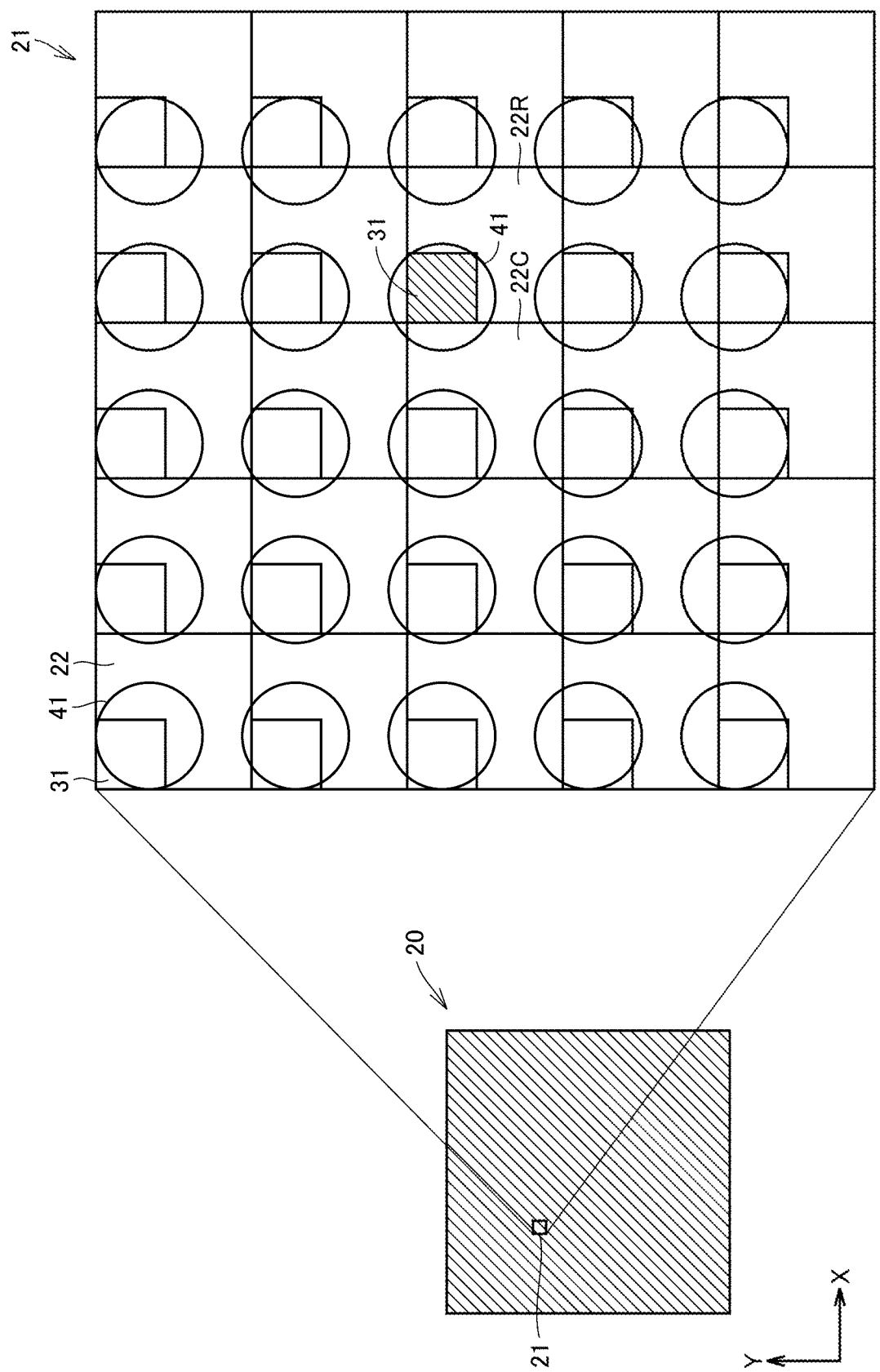
FIG. 39 is a diagram illustrating an example of an illumination pattern for light irradiation shown in FIG. 38.

FIG. 39 is a diagram illustrating an example of the illumination pattern for light irradiation shown in FIG. 38. As shown in FIG. 39, all illumination elements 21 of the illumination device 20 are caused to emit light. In each illumination element 21, a light emitting portion 31 of a cell 22R on the right side (a next cell in the −X direction) of a center cell 22C emits light. The same is true for cells emitting light in other illumination elements 21. Therefore, light LT is radiated obliquely from the right above the surface of the workpiece W.

It is to be noted that the same applies to the case in which the workpiece W is irradiated from a direction rotated by 90° with respect to the light irradiation direction shown in FIG. 36 or FIG. 38. In each illumination element 21, a light emitting portion 31 of a cell on the side above (the next cell in the +Y direction) the center cell 22C emits light. Alternatively, a light emitting portion 31 of a cell on the side below (the next cell in the −Y direction) the center cell 22C emits light.

According to the above method, it is possible to irradiate the workpiece W with ideal parallel light. Thereby, it is possible to increase the accuracy of estimating the normal line to the surface of the workpiece W. Therefore, it is possible to increase the measurement accuracy of the surface shape of the workpiece W.

(Modifications of Illumination Device)

Figure 40:
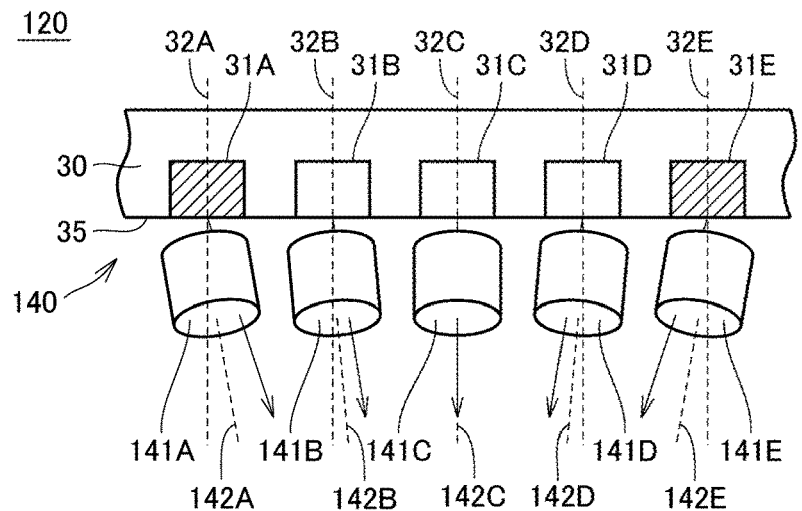
FIG. 40 is a schematic diagram showing a partial cross section of an illumination device according to modification 1.

FIG. 40 is a schematic diagram showing a partial cross section of an illumination device 120 according to modification 1. Compared to the illumination device 20 shown in FIG. 17, the illumination device 120 includes a microlens array 140 instead of the microlens array 40. The microlens array 140 includes a plurality of lenses 141, which are a plurality of microlenses arranged to face a plurality of light emitting portions 31, respectively. FIG. 40 representatively shows lenses 141A to 141E that face light emitting portions 31A to 31E, respectively.

Each of the lenses 141A to 141E is a rod lens. The angle of the optical axis (optical axes 142A to 142E) of the lens with respect to the optical axis (optical axes 32A to 32E) of the light emitting portion 31 is different between the lenses 141A to 141E. By making the angle of incidence of light with respect to the incident surface of the rod lens different, it is possible to make the emission angle (angle with respect to the optical axis of the lens) of light emitted from the exit surface of the rod lens different. Therefore, in the illumination device 120, the light emitting direction can be made different for each light emitting portion. By using the rod lens, it is possible to increase the distance between the workpiece W and the illumination device 120 at which the shape of the workpiece W can be inspected.

Figure 41:
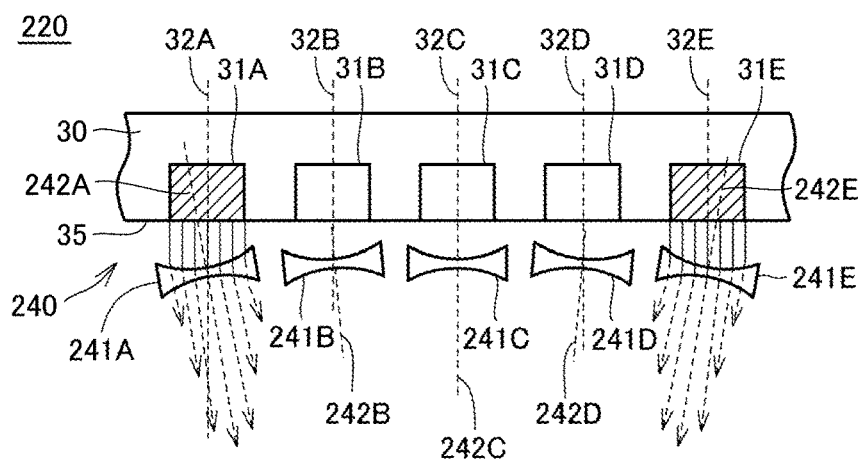
FIG. 41 is a schematic diagram showing a partial cross section of an illumination device according to modification 2.

FIG. 41 is a schematic diagram showing a partial cross section of an illumination device 220 according to modification 2. Compared to the illumination device 20 shown in FIG. 17, the illumination device 220 includes a microlens array 240 instead of the microlens array 40. The microlens array 240 includes a plurality of lenses 241, which are a plurality of microlenses arranged to face a plurality of light emitting portions 31, respectively. FIG. 41 representatively shows lenses 241A to 241E that face light emitting portions 31A to 31E, respectively.

Each of the lenses 241A to 241E is a concave lens. Similar to the modification shown in FIG. 40, the angle of the optical axis of the lens with respect to the optical axis of the light emitting portion 31 is different between the lenses 241A to 241E. By making the angle of the optical axis (optical axes 242A to 242E) of the lens with respect to the optical axis (optical axes 32A to 32E) of the light emitting portion different, it is possible to make the emission angle (angle with respect to the optical axis of the lens) of light emitted from the concave lens different.

Figure 42:
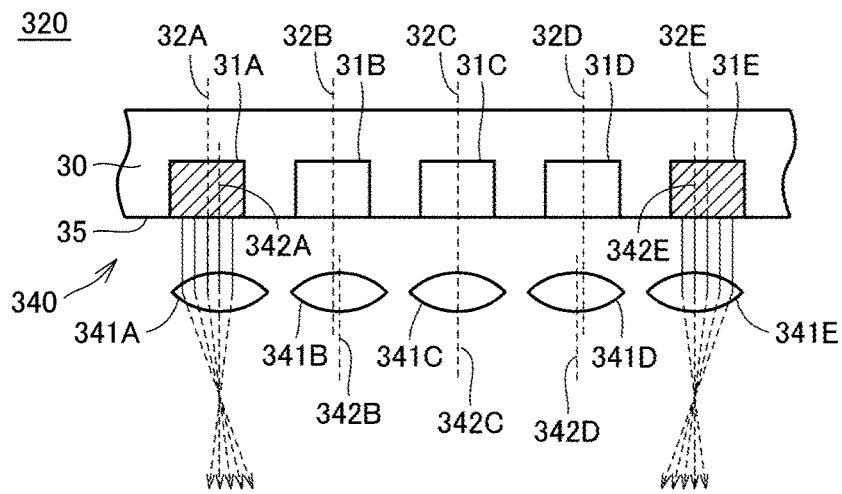
FIG. 42 is a schematic diagram showing a partial cross section of an illumination device according to modification 3.

FIG. 42 is a schematic diagram showing a partial cross section of an illumination device 320 according to modification 3. Compared to the illumination device 20 shown in FIG. 17, the illumination device 320 includes a microlens array 340 instead of the microlens array 40. The microlens array 340 includes a plurality of lenses 341, which are a plurality of microlenses arranged to face a plurality of light emitting portions 31, respectively. FIG. 42 representatively shows lenses 341A to 341E that face light emitting portions 31A to 31E, respectively.

In the modification 3, the lenses 41A to 41E in the configuration of FIG. 17 are replaced by lenses 341A to 341E, and the optical axes 42A to 42E are replaced by optical axes 342A to 342E. Each of the lenses 341A to 341E is a convex lens. However, the shape of each of the lenses 341A to 341E is different from that of the lenses 41A to 41E. Similar to the example shown in FIG. 17, by making the relative position of the optical axis (optical axes 342A to 342E) of the lens with respect to the optical axis (optical axes 32A to 32E) of the light emitting portion different, it is possible to control the irradiation directions of light emitted from the light emitting portions through the lenses.

It is to be noted that, in the illumination device shown in FIGS. 40 and 41, each illumination element includes a plurality of cells 22 arranged in a matrix (see FIG. 19). The angle of inclination of the optical axis of the lens with respect to the optical axis of the light emitting portion can be made different between the plurality of cells 22 according to the position of the cell. Further, the angle of the optical axis of the lens with respect to the X axis and the angle of the optical axis of the lens with respect to the Y axis can be made different.

Furthermore, in the microlens arrays 140, 240, and 340 shown in FIGS. 40 to 42, a light shielding portion 44 (see FIGS. 20 to 23) may be arranged around the lens.

D. Other Example of Shape of Workpiece

Although the shape of the workpiece W is a rectangular parallelepiped in the above description, the shape of the workpiece W is not limited to this. For example, the workpiece W may include a planar surface portion and a tapered portion.

Figure 43:
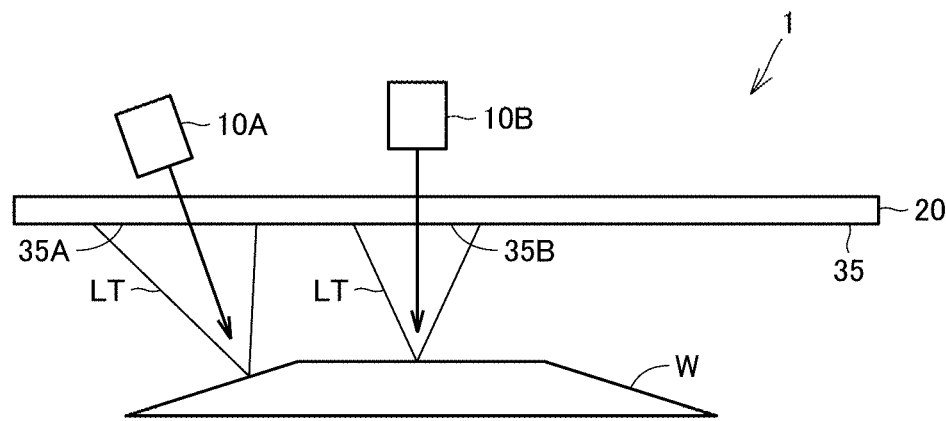
FIG. 43 is a diagram illustrating an arrangement of an illumination device and a plurality of cameras for illuminating and imaging a workpiece W including a planar surface portion and a tapered portion.

FIG. 43 is a diagram illustrating an arrangement of an illumination device and a plurality of cameras for illuminating and imaging a workpiece W including a planar surface portion and a tapered portion. As shown in FIG. 43, the workpiece W has a tapered portion (an inclined surface). A camera 10A is disposed such that the optical axis of the camera 10A is inclined to image an inclined surface of the workpiece W and a recess (not shown) present in the inclined surface thereof. On the other hand, a camera 10B images the planar surface portion (top surface) of the workpiece W. In the arrangement shown in FIG. 43, the optical axis of the camera 10A and the optical axis of the camera 10B are not parallel to each other. Light is emitted from a region 35A of the light emitting surface 35 to illuminate the inclined surface of the workpiece W and light is emitted from a region 35B of the light emitting surface 35 to illuminate the planar surface portion of the workpiece W.

Figure 44:
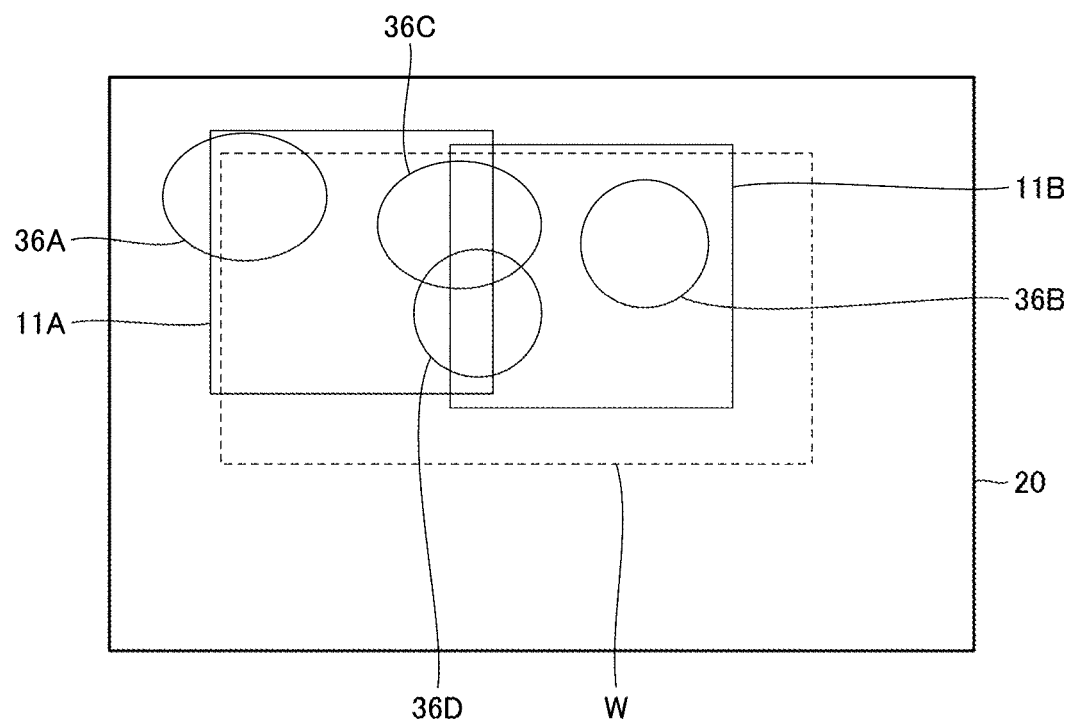
FIG. 44 is a plan view schematically illustrating an arrangement of light emitting regions of the illumination device and the fields of view of a plurality of cameras when the workpiece shown in FIG. 43 is imaged with the plurality of cameras.

FIG. 44 is a plan view schematically illustrating an arrangement of light emitting regions of the illumination device and the fields of view of a plurality of cameras when the workpiece shown in FIG. 43 is imaged with the plurality of cameras. The fields of view 11A and 11B are the fields of view of the cameras 10A and 10B, respectively. A part of the field of view 11A and a part of the field of view 11B overlap each other. The cameras 10A and 10B may be arranged such that parts of the fields of view overlap each other, similar to when they image a planar surface portion of a workpiece (see FIG. 8). Regions 36A, 36B, 36C, and 36D are light emitting regions on the light emitting surface 35. The regions 36A and 36C are regions for illuminating the inclined surface of the workpiece W. On the other hand, the regions 36B and 36D are regions for illuminating the top surface of the workpiece W.

When a surface parallel to the light emitting surface and a surface not parallel to the light emitting surface among the surfaces of the workpiece W are irradiated with light of a common irradiation pattern, the angle at which light is incident on the parallel surface and the angle at which light is incident on the non-parallel surface are different from each other and thus the illumination conditions change between the surfaces. In the first and second embodiments, the irradiation pattern can be changed and thus the same illumination conditions can be provided for each local surface on the surface of the workpiece W. As a result, the measurement accuracy can be improved.

When control of the illumination device according to the first embodiment is applied to a workpiece having such a shape, the illumination pattern can be corrected, for example, in the following way.

Figure 45:
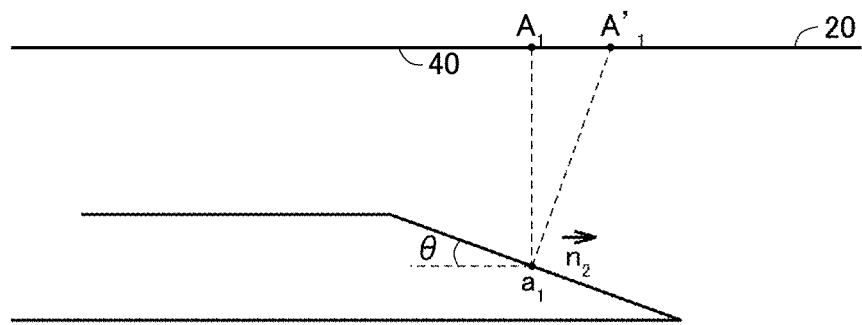
FIG. 45 is a diagram illustrating another example of an irradiation pattern correction method according to the first embodiment.

FIG. 45 is a diagram illustrating another example of the irradiation pattern correction method according to the first embodiment. For example, in the example shown in FIG. 45, it is assumed that a flat reference object is used when calibration is performed and the position of an illumination element corresponding to a target position $a_1$ is a position $A_1$. When a plane including and corresponding to the target position $a_1$ on the workpiece W to be inspected is not parallel to a light emitting surface 35, the position of the illumination element may be corrected to a position $A'_1$ according to the inclination θ of the plane and the distance between the target position $a_1$ and the illumination device 20.

Figure 46:
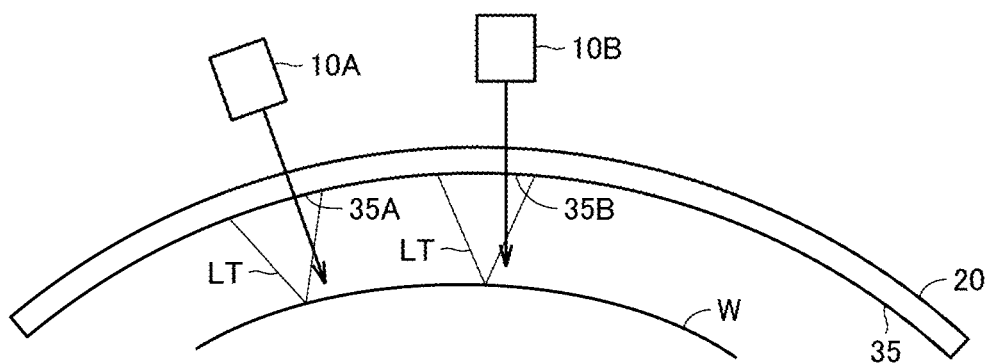
FIG. 46 is a diagram illustrating a configuration of an image inspection device for imaging a workpiece having a non-planar surface.

The image inspection device according to the present embodiment may also adopt a configuration described below. FIG. 46 is a diagram illustrating a configuration of an image inspection device for imaging a workpiece W having a non-planar surface. As shown in FIG. 46, the angles of optical axes of cameras 10A and 10B are adjusted to image the surface of the workpiece W. A light emitting surface 35 of an illumination device 20 is non-planar. For example, the outer shape of the illumination device 20 may be curved to follow the surface of the workpiece W. Since the light emitting surface 35 of the illumination device 20 is non-planar, a plurality of cameras can be arranged suitably when the plurality of cameras are installed to surround the workpiece W.

Various variations can be adopted for the non-planar shape of the light emitting surface 35. For example, a non-planar surface may be a combination of different planes which has a shape like a bent plane. Alternatively, the non-planar surface may be a curved surface as shown in FIG. 46 or a combination of different curved surfaces. Alternatively, the non-planar surface may be a combination of a curved surface and a planar surface. The type of the curved surface is not particularly limited, and may be, for example, a cylindrical surface, a conical surface, or a spherical surface. Alternatively, the curved surface may be a hyperboloid, a paraboloid, a surface of an ellipsoid, or the like.

It is desirable that the non-planar light emitting surface 35 be at an angle nearly perpendicular to the optical axis of each camera although the disclosure is not limited to this. Further, the light emitting surface 35 (that is, the illumination device 20) is arranged such that it does not physically interfere with the workpiece W or the plurality of cameras.

Thus, the optical axes of the plurality of cameras may be non-parallel. In addition, the light emitting surface 35 of the illumination device 20 is not limited to a planar surface and may be a non-planar surface.

E. Supplementary Description

As is apparent from the above description, the present embodiments include the following disclosures.

(Configuration 1)

An image inspection device (1) for inspecting an object (W) using a captured image, the image inspection device (1) including:

a plurality of imaging parts (10A, 10B, 10C) configured to image the object (W);

an illumination part (20, 120, 220, 320) that is disposed between the object (W) and the plurality of imaging parts (10A, 10B, 10C) and is configured to radiate light toward the object (W) and has a light-transmissive property; and a control part (100) configured to control the plurality of imaging parts (10A, 10B, 10C) and the illumination part (20, 120, 220, 320), wherein the illumination part (20, 120, 220, 320) includes a plurality of illumination elements (21) which are arranged in a matrix and are allowed to be turned on independently, and the control part (100) is configured to control an irradiation position of the light by controlling turning on and off of the plurality of illumination elements (21) to cause the illumination part (20, 120, 220, 320) to illuminate a region of the object (W) corresponding to a field of view (11A, 11B, 11C) of the plurality of imaging parts (10A, 10B, 10C) and to cause the plurality of imaging parts (10A, 10B, 10C) to image the object (W).

(Configuration 2)

The image inspection device (1) according to configuration 1, wherein the control part (100) is configured to control turning on and off of the plurality of illumination elements (21) in a time division fashion to cause the illumination part (20, 120, 220, 320) to radiate light of a first irradiation pattern ($L_1$) to the object (W) and then to cause the illumination part (20, 120, 220, 320) to radiate light of a second irradiation pattern ($L_2$) to the object (W), and the control part (100) is configured to cause a first imaging part (10A) among the plurality of imaging parts (10A, 10B) to image the object (W) to acquire first image data when light of the first irradiation pattern ($L_1$) is radiated to the object (W) and to cause a second imaging part (10B) among the plurality of imaging parts (10A, 10B) to image the object (W) to acquire second image data when light of the second irradiation pattern ($L_2$) is radiated to the object (W).

(Configuration 3)

The image inspection device (1) according to configuration 2, wherein the control part (100) is configured to perform an image measurement process on the object (W) using a plurality of pieces of image data including at least the first image data and the second image data, the first image data is associated with a first target position ($a_1$) within an imaging field of view (81) of the first imaging part, the second image data is associated with a second target position ($a_2$) within an imaging field of view (81) of the second imaging part, the first irradiation pattern ($L_1$) is determined according to the first target position ($a_1$), and the second irradiation pattern ($L_2$) is determined according to the second target position ($a_2$).

(Configuration 4)

The image inspection device (1) according to configuration 3, wherein the first irradiation pattern and the second irradiation pattern are determined such that a direction of incidence (θ) of light radiated from the illumination part (20, 120, 220, 320) to the first target position ($a_1$) is substantially the same as a direction of incidence (θ) of light radiated from the illumination part (20, 120, 220, 320) to the second target position ($a_2$).

(Configuration 5)

The image inspection device (1) according to configuration 3 or 4, wherein the control part (100) is configured to sequentially change an irradiation pattern of light radiated from the illumination part (20, 120, 220, 320) to the object (W) and to cause the plurality of imaging parts (10A, 10B)

to sequentially image the object in accordance with the sequential change of the irradiation pattern.

(Configuration 6)

The image inspection device (1) according to any one of configurations 1 to 5, wherein each of the plurality of imaging parts (10A, 10B) includes a reading circuit configured to read an image signal from a part of a plurality of light receiving elements (83) configured to convert light included in the imaging field of view (81) into the image signal.

(Configuration 7)

The image inspection device (1) according to configuration 6, wherein at least a part of a process of reading an image signal from a first light receiving element (83-1) which is a part of the plurality of light receiving elements (83) and at least a part of a process of exposing a second light receiving element (83-2) which is a part of the plurality of light receiving elements (83) in a state in which light is being radiated from the illumination part are performed simultaneously.

(Configuration 8)

The image inspection device (1) according to configuration 1, wherein the illumination part (20, 120, 220, 320) includes:

a plurality of light emitting portions (31, 31A-31E) which are arranged in a matrix and can selectively emit light; and an optical system (40, 140, 240, 340) configured to control an irradiation direction of the light emitted from each of the plurality of light emitting portions (31, 31A-31E) such that it is in a direction corresponding to a position of the light emitting portion.

(Configuration 9)

The image inspection device (1) according to configuration 8, wherein the optical system (40, 140, 240, 340) includes a plurality of microlenses (41, 41A-41E, 141A-141E, 241A-241E, 341A-341E) provided to face the plurality of light emitting portions (31, 31A-31E), respectively.

(Configuration 10)

The image inspection device (1) according to configuration 9, wherein the plurality of microlenses (41, 41A-41E, 141A-141E, 241A-241E, 341A-341E) are arranged such that an optical axis (42, 42A-42E, 142A-142E, 242A-242E, 342A-342E) of at least a part of the plurality of microlenses deviates from an optical axis (32, 32A-32E) of a light emitting portion that faces at least the part of the plurality of microlenses.

(Configuration 11)

The image inspection device (1) according to configuration 10, wherein, in at least one of the plurality of illumination elements (21), at least the part of the plurality of microlenses (41, 41A-41E, 341A-341E) is arranged at a pitch (P1) smaller than a pitch (P2) of the light emitting portions (31, 31A-31E).

(Configuration 12)

The image inspection device (1) according to configuration 9, wherein the plurality of microlenses (141A-141E, 241A-241E) are arranged such that an optical axis (142A-142E, 242A-242E) of at least a part of the plurality of microlenses (141A-141E, 241A-241E) is inclined with respect to an optical axis of a light emitting portion that faces at least the part of the plurality of microlenses.

(Configuration 13)

The image inspection device (1) according to any one of configurations 9 to 12, wherein the illumination part (20, 120, 220, 320) further includes a light shielding portion (44) configured to shield light that leaks at a periphery of each of the plurality of microlenses among light emitted from the plurality of light emitting portions (31, 31A-31E).

(Configuration 14)

The image inspection device (1) according to configuration 1, wherein the illumination part (20, 120, 220, 320) has a light emitting surface (35) that is non-planar.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image inspection device for inspecting an object using a captured image, the image inspection device comprising:

a plurality of imaging parts configured to image the object;

an illumination part that is disposed between the object and the plurality of imaging parts and is configured to radiate light toward the object and has a light-transmissive property; and a control part configured to control the plurality of imaging parts and the illumination part, wherein the illumination part includes a plurality of illumination elements which are arranged in a matrix and are allowed to be turned on independently, and the control part is configured to control an irradiation position of the light by controlling turning on and off of the plurality of illumination elements to cause the illumination part to illuminate a region of the object corresponding to a field of view of the plurality of imaging parts and to cause the plurality of imaging parts to image the object, wherein each of the illumination element comprises a light emitting portion, a microlens, and a transparent region, wherein the plurality of imaging parts images the object through the transparent regions of the illumination elements, wherein the control part is configured to control turning on and off of the plurality of illumination elements in a time division fashion to cause the illumination part to radiate light of a first irradiation pattern to the object and then to cause the illumination part to radiate light of a second irradiation pattern to the object, and the control part is configured to cause a first imaging part among the plurality of imaging parts to image the object to acquire first image data when light of the first irradiation pattern is radiated to the object and to cause a second imaging part among the plurality of imaging parts to image the object to acquire second image data when light of the second irradiation pattern is radiated to the object, wherein a relative position between the plurality of imaging parts and the object is the same when acquiring the first image data and when acquiring the second image data.

2. The image inspection device according to claim 1, wherein the control part is configured to perform an image measurement process on the object using a plurality of pieces of image data including at least the first image data and the second image data, the first image data is associated with a first target position within an imaging field of view of the first imaging part, the second image data is associated with a second target position within an imaging field of view of the second imaging part, the first irradiation pattern is determined according to the first target position, and the second irradiation pattern is determined according to the second target position.

3. The image inspection device according to claim 2, wherein the first irradiation pattern and the second irradiation pattern are determined such that a direction of incidence of light radiated from the illumination part to the first target position is substantially the same as a direction of incidence of light radiated from the illumination part to the second target position.

4. The image inspection device according to claim 3, wherein the control part is configured to sequentially change an irradiation pattern of light radiated from the illumination part to the object and to cause the plurality of imaging parts to sequentially image the object in accordance with the sequential change of the irradiation pattern.

5. The image inspection device according to claim 4, wherein each of the plurality of imaging parts includes a reading circuit configured to read an image signal from a part of a plurality of light receiving elements configured to convert light included in the imaging field of view into the image signal.

6. The image inspection device according to claim 3, wherein each of the plurality of imaging parts includes a reading circuit configured to read an image signal from a part of a plurality of light receiving elements configured to convert light included in the imaging field of view into the image signal.

7. The image inspection device according to claim 2, wherein the control part is configured to sequentially change an irradiation pattern of light radiated from the illumination part to the object and to cause the plurality of imaging parts to sequentially image the object in accordance with the sequential change of the irradiation pattern.

8. The image inspection device according to claim 7, wherein each of the plurality of imaging parts includes a reading circuit configured to read an image signal from a part of a plurality of light receiving elements configured to convert light included in the imaging field of view into the image signal.

9. The image inspection device according to claim 2, wherein each of the plurality of imaging parts includes a reading circuit configured to read an image signal from a part of a plurality of light receiving elements configured to convert light included in the imaging field of view into the image signal.

10. The image inspection device according to claim 1, wherein each of the plurality of imaging parts includes a reading circuit configured to read an image signal from a part of a plurality of light receiving elements configured to convert light included in the imaging field of view into the image signal.

11. The image inspection device according to claim 1, wherein each of the plurality of imaging parts includes a reading circuit configured to read an image signal from a part of a plurality of light receiving elements configured to convert light included in the imaging field of view into the image signal.

12. The image inspection device according to claim 11, wherein at least a part of a process of reading an image signal from a first light receiving element which is a part of the plurality of light receiving elements and at least a part of a process of exposing a second light receiving element which is a part of the plurality of light receiving elements in a state in which light is being radiated from the illumination part are performed simultaneously.

13. The image inspection device according to claim 1, wherein the plurality of light emitting portions are arranged in a matrix and can selectively emit light, wherein the illumination part further includes an optical system configured to control an irradiation direction of the light emitted from each of the plurality of light emitting portions such that it is in a direction corresponding to a position of the light emitting portion.

14. The image inspection device according to claim 13, wherein the plurality of microlenses face the plurality of light emitting portions, respectively.

15. The image inspection device according to claim 14, wherein the plurality of microlenses are arranged such that an optical axis of at least a part of the plurality of microlenses deviates from an optical axis of a light emitting portion that faces at least the part of the plurality of microlenses.

16. The image inspection device according to claim 15, wherein, in at least one of the plurality of illumination elements, at least the part of the plurality of microlenses is arranged at a pitch smaller than a pitch of the light emitting portions.

17. The image inspection device according to claim 14, wherein the plurality of microlenses are arranged such that an optical axis of at least a part of the plurality of microlenses is inclined with respect to an optical axis of a light emitting portion that faces at least the part of the plurality of microlenses.

18. The image inspection device according to claim 14, wherein the illumination part further includes a light shielding portion configured to shield light that leaks at a periphery of each of the plurality of microlenses among light emitted from the plurality of light emitting portions.

19. The image inspection device according to claim 1, wherein the illumination part has a light emitting surface that is non-planar.

* * * * *